United States Patent
Stinger et al.

(10) Patent No.: US 7,096,665 B2
(45) Date of Patent: Aug. 29, 2006

(54) CASCADING CLOSED LOOP CYCLE POWER GENERATION

(75) Inventors: Daniel H. Stinger, Sugar Land, TX (US); Farouk Aslam Mian, Houston, TX (US)

(73) Assignee: WOW Energies, Inc., Sugar Land, TX (US)

( * ) Notice: Subject to any disclaimer, the term of this patent is extended or adjusted under 35 U.S.C. 154(b) by 283 days.

(21) Appl. No.: 10/377,114

(22) Filed: Mar. 3, 2003

(65) Prior Publication Data

US 2004/0011038 A1  Jan. 22, 2004

Related U.S. Application Data

(63) Continuation-in-part of application No. 10/199,257, filed on Jul. 22, 2002, now Pat. No. 6,857,268.

(51) Int. Cl.
| | |
|---|---|
| *F01K 25/08* | (2006.01) |
| *F01K 1/00* | (2006.01) |
| *F01K 25/00* | (2006.01) |
| *F01K 7/34* | (2006.01) |
| *F03G 7/00* | (2006.01) |

(52) U.S. Cl. ............... 60/651; 60/653; 60/655; 60/671; 60/673; 60/676

(58) Field of Classification Search ............... 60/649, 60/651, 653, 655, 671, 673, 676
See application file for complete search history.

(56) References Cited

U.S. PATENT DOCUMENTS

| | | | |
|---|---|---|---|
| 4,078,976 A | 3/1978 | Spears, Jr. ............. 60/648 |
| 4,104,535 A | 8/1978 | Bronicki | |
| 4,132,075 A | 1/1979 | Fleck et al. | |
| 4,372,124 A | 2/1983 | Newton et al. ............. 60/649 |
| 4,677,827 A | 7/1987 | Shenoy et al. ............. 60/648 |
| 4,711,093 A | 12/1987 | Markbreiter et al. ........... 62/87 |
| 4,873,834 A | 10/1989 | Cox ............. 62/87 |
| 5,038,567 A | 8/1991 | Mortiz ............. 60/671 |
| 5,425,230 A | 6/1995 | Shpak ............. 60/39.181 |
| 5,570,579 A | 11/1996 | Larjola ............. 60/651 |
| 5,649,426 A * | 7/1997 | Kalina et al. ............. 60/649 |
| 5,660,042 A | 8/1997 | Bronicki et al. ............. 60/655 |
| 5,664,414 A | 9/1997 | Bronicki et al. ......... 60/39.182 |
| 5,687,570 A | 11/1997 | Bronicki et al. | |
| 5,754,613 A * | 5/1998 | Hashiguchi et al. ........... 60/649 |
| 5,953,918 A * | 9/1999 | Kalina et al. ............. 60/653 |
| 6,052,997 A | 4/2000 | Rosenblatt ............. 60/653 |

(Continued)

OTHER PUBLICATIONS

Ronald DiPippo, "Geothermal Power Systems," Standard Handbook of Powerplant Engineering, sec. 8.2.

(Continued)

*Primary Examiner*—Sheldon J Richter
(74) *Attorney, Agent, or Firm*—Hunton & Williams

(57) ABSTRACT

Cascading Closed Loop Cycle (CCLC) and Super Cascading Closed Loop Cycle (Super-CCLC) systems are described for recovering power in the form of mechanical or electrical energy from the waste heat of a steam turbine system. The waste heat from the boiler and steam condenser is recovered by vaporizing propane or other light hydrocarbon fluids in multiple indirect heat exchangers; expanding the vaporized propane in multiple cascading expansion turbines to generate useful power; and condensing to a liquid using a cooling system. The liquid propane is then pressurized with pumps and returned to the indirect heat exchangers to repeat the vaporization, expansion, liquefaction and pressurization cycle in a closed, hermetic process.

69 Claims, 5 Drawing Sheets

U.S. PATENT DOCUMENTS

| | | |
|---|---|---|
| 6,195,997 B1 | 3/2001 | Lewis et al. |
| 6,233,939 B1 * | 5/2001 | Ngo-Beelmann et al. ...... 60/653 |
| 6,694,740 B1 * | 2/2004 | Nayar .......................... 60/651 |
| 6,735,948 B1 * | 5/2004 | Kalina .......................... 60/649 |
| 6,857,268 B1 * | 2/2005 | Stinger et al. ................. 60/651 |

OTHER PUBLICATIONS

L. Bronicki, "Rankine Cycle Power Unit Operating with Isotopic Heat Sources," Joint UKAEA-ENEA International Symposium (1996).

\* cited by examiner

CASCADING CLOSED LOOP CYCLE POWER GENERATION

This is a continuation-in-part of U.S. patent application Ser. No. 10/199,257, filed on Jul. 22, 2002 now U.S. Pat. No. 6,857,268.

FIELD OF THE INVENTION

The present invention relates to apparatus and methods for generating energy. More specifically, the present invention relates to the use of a Cascading Closed Loop Cycle employing particular devices and fluids that may be used in combination with conventional power generation systems to extract a useful amount of additional energy from the conventional power generation process.

BACKGROUND OF THE INVENTION

The primary process used to generate electricity is the combustion of a fossil fuel to heat air. This high temperature air, or thermal energy, is then used to heat a liquid power generation medium (typically water) in a boiler to create a gas (steam) that is expanded across a steam turbine that drives an electrical generator. The measure of the thermal energy is the British Thermal Unit (BTU). Other sources of energy used to heat air and/or water to generate electricity in this manner include: heat from nuclear reactions; heat from the exhaust of gas turbines; heat from the combustion of refuse or other combustible materials in incinerators; and others.

Steam turbine systems used to generate power are generally closed loop systems in which pressurized water is vaporized in a boiler or heat exchanger; expanded in the steam turbine where the pressure levels are reduced as power is generated; condensed back to water in a condenser or cooler; and pumped back to pressure and returned to the boiler to repeat the cycle. In the process of making steam in this closed loop system, there are two major sources of wasted energy. The first is the waste heat exiting the boiler in the form of high temperature flue gas (typically heated air) due to the inherent design and thermodynamic characteristics of the water to steam conversion process that prevents using all the useful thermal energy (heat) in the flue gas. The second is the latent heat of vaporization or the amount of energy required to convert water to steam that is dissipated to the atmosphere during the process of condensing the steam back to water.

In the first instance of wasted heat, the boiler heat source must provide thermal energy (in the form of high temperature flue gas) not only to deliver 1000 BTU/LB to convert water to steam but also sufficient thermal energy to superheat the steam to high enough energy levels to provide sufficient excess energy to drive a steam turbine to generate power. The thermodynamic requirements of the steam cycle limit the temperature differential available to produce superheated steam to the difference between the original heat source temperature and approximately 400 to 500° F. This results in wasted heated flue gas exiting the boiler at temperatures of about 400 to 500° F. Although a portion of the energy in the flue gas exhaust may be recaptured by, for example, using it to heat the power plant, using it to pre-heat the boiler water, or by other known means, the amount of useful energy recovered is limited.

In the second instance of wasted heat, the energy in the form of heat required to change the state of a liquid to a gas is controlled by the thermodynamic characteristics of the liquid. The pressure and associated temperature at which a fluid begins to become a vapor is defined as the vapor pressure of the fluid. For a given liquid there is a specific range of pressures and temperatures at which the liquid becomes a vapor. The BTUs required to change a liquid to a gas at the vapor pressure is defined as the "heat of vaporization". The heat of vaporization for water is approximately 1000 BTU/LB. At the vapor pressure at which water turns to steam, the amount of energy resident in the vapor is only that amount required to maintain a vaporous state and is defined as the "latent heat of vaporization". At the vapor pressure point, if the vapor is cooled in a condenser or the pressure is reduced through an expansion process, the vapor will change states back to a liquid by discharging the latent heat of vaporization, or 1000 BTU/LB to the environment as an increase in thermal energy or temperature of the cooling medium. As such, little, if any, useful energy can be extracted from a vapor that only contains the latent heat of vaporization because such vapor will immediately condense upon expansion in a turbine, causing dramatic inefficiencies and possibly damaging the turbine. The physical phenomenon of the heat of vaporization causes waste heat in conventional power generation cycles because this amount of heat must be imparted into the liquid water before it changes into a useful gaseous state but this heat can not be extracted as useful energy. Upon cooling the medium back to a liquid so that it can be pumped to the desired pressure, this latent heat is discharged without being recaptured in the form of useful energy. Thus, the thermal energy discharged to the atmosphere through the cooling medium that returns the water to the liquid state is waste heat.

Converting heat to useful power and developing power in a more efficient manner from the combustion of fossil fuels are of paramount importance as fuel costs rise and energy sources are depleted. In addition, the negative effects on the environment caused by pollution generated from the combustion of fossil fuels dictates that power plants be designed to reduce the pollutants generated per unit of energy produced. These factors create a need to improve power plant efficiency and recover energy from waste heat generated by power plants, waste heat from various manufacturing processes, and thermal energy from renewable energy sources.

Various methods and processes are used to improve the efficiency of power systems that convert fossil fuels to usable energy. These efficiency-enhancing systems include gas turbine combined cycle plants, cogeneration plants and waste heat recovery systems. Cogeneration and combined cycle systems generate useful energy from the waste heat of gas turbine exhausts or other fossil fuel heat sources, including low grade heating value fuel sources, by using the heat of combustion to generate steam. In systems that use water as the primary power generation medium, the temperature of the heat source (typically flue gas heated by combusting fossil fuels) must be high enough to vaporize the water to create steam in a heat exchanger (boiler). The resulting steam is expanded in a steam turbine to produce power. Steam boilers are generally limited to recovering the thermal energy associated with the differential temperature between the initial temperature of the heat source and about 500° F. or higher because this is the temperature required to achieve efficient thermal energy transfer to water to produce steam. Further, the available heat for transferring energy to the steam is limited by the temperature differential restrictions imposed by the vapor pressure versus temperature characteristics of steam, and using a heat source with a temperature close to about 500° F. can lead to inefficient and minimal steam production. In a typical steam power generation system, the low temperature (~500° F.) exhaust of the heat source exiting the boiler can be used to pre-heat the boiler feed water using a separate heat exchanger. However, only a limited amount of the heat in the discharge air is recoverable, and this heat is generally restricted to the temperature differential between the ~500° F. discharge temperature of the heat source exhaust and about 300° F. or above due to the vapor pressure and temperature characteristics of water. Using the exhaust heat to pre-heat the boiler feed water in this manner increases the overall efficiency of the system, and may provide about a 10% increase in efficiency in some cases.

Some cogeneration and combined cycle systems also envision incorporating an Organic Rankine Cycle (ORC) system in combination with the steam turbine system to capture additional power output from the low temperature exhaust stream of the heat source as it exits the boiler. Methods are known in the prior art that utilize an ORC cycle to generate useful power. Typical methods are disclosed, for example, in U.S. Pat. Nos. 5,570,579 and 5,664,414, which are incorporated herein by reference. These prior art systems use a conventional ORC medium such as normal pentane, iso-pentane, toluene, fluorinated hydrocarbons and other refrigerants. These conventional ORC media have pressure and temperature limitations and can not sustain high temperatures due to their respective auto ignition temperatures and vapor pressure versus temperature characteristics. For example, prior art ORC systems that utilize refrigerants or toluene are restricted to operation with heated water since the ORC medium can not absorb energy at elevated temperatures. Other prior art ORC methods require an ORC medium with a vapor pressure near atmospheric pressure to be efficient. Other prior art systems are restricted to a specific power output range while others require spraying a fluid ORC medium into the heat exchanger for efficient operation. These limitations reduce their effectiveness and efficiency thereby restricting the circumstances under which they can be employed, and limiting the useful energy output that may be obtained from them.

In addition, although the majority of energy is generated using closed loop systems (i.e., systems in which the power generation medium, such as water/steam is constantly recirculated) such as those described above, other methods of generating power have been created to take advantage of open loop power sources that require constant replenishment of the power generation medium. For example, where the pressure of light hydrocarbon supplies in petrochemical plants or on gas pipelines must be reduced before being sent to consumers, it is known to generate useful power by expanding the high pressure gas in an expansion turbine that operates an electrical generator, pump or compressor, rather then reducing the gas pressure in a valve where no energy is recovered. Examples of this type of technology are provided in U.S. Pat. Nos. 4,711,093 and 4,677,827, which are incorporated herein by reference. These systems are open loop systems that require constant replenishment of the power generation medium, and depend on the pressure level of the process design.

BRIEF DESCRIPTION OF THE INVENTION

In a first embodiment, the present invention provides a method for generating energy. This method includes the steps of providing a working fluid, increasing the pressure of the working fluid, dividing the working fluid into multiple streams, including at least a first stream and a second stream, transferring a first amount of heat energy from an energy source to the first stream and subsequently transferring a second amount of heat energy from the first steam to the second stream, extracting a first amount of useful energy from the first stream, extracting a second amount of useful energy from the second stream, merging the first stream with the second stream, and reducing the first stream and the second stream to a minimum pressure. The minimum pressure is approximately equal to or below the vapor pressure of the working fluid at an ambient temperature.

In this embodiment, the step of transferring a second amount of heat energy from the first stream to the second stream may comprise the steps of transferring a first portion of the second amount of heat energy from the first stream to the second stream before the step of merging the first stream with the second stream; and transferring a second portion of the second amount of heat energy from the first stream to the second stream after the step of merging the first stream with the second stream. Also in this embodiment the step of transferring a first portion of the second amount of heat energy from the first stream to the second stream may be performed after the step of extracting a first amount of useful energy from the first stream. Still further in this embodiment, the sum of the first amount of useful energy and the second amount of useful energy may be equal to at least about 20% of the first amount of heat energy.

In this and other embodiments of the invention, the working fluid may be selected from the group consisting of propane, propylene, light hydrocarbons and combinations thereof; the minimum pressure may be about 25 psia to about 300 psia; the ambient temperature may be about −50 degrees Fahrenheit to about 160 degrees Fahrenheit; the energy source may be selected from the group consisting of fossil fuel energy, nuclear energy, solar energy, geothermal energy, waste heat, hydrogen and combinations thereof. Also in this and other embodiments, the working fluid may be pumped to a pressure of about 300 psia to about 1000 psia.

In another embodiment, the present invention provides an apparatus for generating energy. The apparatus has: multiple fluid conduits, including at least a first fluid conduit, a second fluid conduit, and a combined fluid conduit, the multiple fluid conduits being adapted to contain a working fluid; a pump operatively attached to the multiple fluid conduits and adapted to pressurize the working fluid; an energy source; a first heat exchanger operatively attached to the first fluid conduit and adapted to allow a first amount of heat energy to transfer from the energy source to the working fluid in the first fluid conduit; a second heat exchanger operatively attached to the first fluid conduit and the second fluid conduit and adapted to allow a second amount of heat energy to transfer from the working fluid in the first fluid conduit to the working fluid in the second fluid conduit, the second heat exchanger being positioned, with respect to the first fluid conduit, downstream of the first heat exchanger; a first fluid expander operatively attached to the first fluid conduit and adapted to extract a first amount of useful energy from the working fluid in the first fluid conduit; a second fluid expander operatively attached to the second fluid conduit and adapted to extract a second amount of useful energy from the working fluid in the second fluid conduit; and a cooling device operatively attached to at least one of the multiple fluid conduits and adapted to reduce the working fluid to a minimum pressure, the minimum pressure being approximately equal to or below the vapor pressure of the fluid at an ambient temperature. The first fluid conduit and the second fluid conduit join at a merge point to form the combined fluid conduit.

In this second embodiment, the second heat exchanger may have a primary second heat exchanger operatively attached to the primary fluid conduit and the secondary fluid conduit, and being located, with respect to the first fluid conduit, between the first fluid expander and the merge point, and being adapted to transfer a first portion of the second amount of heat energy from the working fluid in the first fluid conduit to the working fluid in the second fluid conduit; and a secondary second heat exchanger operatively attached to the second fluid conduit and the combined fluid conduit, and being positioned, with respect to the combined fluid conduit, between the merge point and the pump, and being adapted to transfer a second portion of the second amount of heat energy from the working fluid in the combined fluid conduit to the working fluid in the second fluid conduit. The second heat exchanger may be positioned, with respect to the first fluid conduit, after the first fluid expander. Also in this embodiment, the sum of the first amount of useful energy and the second amount of useful energy may be equal to at least about 20% of the first amount of heat energy.

In still another embodiment, the present invention provides a method for converting heat to useful energy that includes the steps of providing a combined fluid stream in a liquid state; pressurizing the combined fluid stream; dividing the combined fluid stream into a primary fluid stream and a secondary fluid stream; applying thermal energy from a heat source to vaporize the primary fluid stream; expanding the vaporized primary fluid stream to produce a first amount of useful energy; transferring heat from the vaporized and expanded primary fluid stream to superheat the vaporized secondary fluid stream; expanding the vaporized second fluid stream to produce a second amount of useful energy; mixing the vaporized and expanded primary fluid stream with the vaporized and expanded secondary fluid stream to form a combined fluid stream; transferring heat from the combined fluid stream to vaporize the secondary fluid stream; and condensing the combined fluid stream to a liquid state.

In this embodiment, the step of transferring heat from the combined fluid stream to vaporize the secondary fluid stream may also include the step of maintaining the pressure of the combined fluid stream above the vapor pressure of the fluid.

In still another embodiment, the present invention provides an apparatus for converting heat to useful energy. The apparatus includes a combined fluid conduit adapted to convey a fluid stream; a pump operatively attached to the combined fluid conduit; a stream separator operatively attached to the combined fluid conduit downstream of the pump, the stream separator further being operatively attached to a primary fluid conduit and a secondary fluid conduit; a first heat exchanger operatively attached to the primary fluid conduit downstream of the stream separator, the first heat exchanger further being operatively attached to a heat source; a first expander operatively attached to the primary fluid conduit downstream of the first heat exchanger; a second heat exchanger operatively attached to the primary fluid conduit downstream of the first expander, the second heat exchanger further being operatively attached to the secondary fluid conduit; a third heat exchanger operatively attached to the secondary fluid conduit downstream of the fluid separator; the third heat exchanger further being operatively attached to the combined fluid conduit; a second expander operatively attached to the secondary fluid conduit downstream of the second heat exchanger; a stream mixer operatively attached to the combined fluid conduit, to the primary fluid conduit downstream of the second heat exchanger, and to the secondary fluid conduit downstream of the second expander; and a cooler operatively attached to the combined fluid conduit between the stream mixer and the pump. The third heat exchanger is positioned, with respect to the combined fluid conduit, between the stream mixer and the cooler, and the second heat exchanger is positioned, with respect to the secondary fluid conduit, between the third heat exchanger and the second expander.

In yet another embodiment, the present invention provides a method for improving the efficiency of a power system having an energy source and a cooling system. The method includes the steps of transferring a first amount of heat energy from the cooling system to a first loop of a cascading closed loop cycle system; extracting a first amount of useful energy from the first loop; transferring a second amount of heat energy from the energy source to a second loop of a cascading closed loop cycle system; and extracting a second amount of useful energy from the second loop.

In this embodiment, the method may include the steps of transferring a third amount of heat energy from the second loop to a third loop of a cascading closed loop cycle system and extracting a third amount of useful energy from the third loop. Also in this embodiment, the power system may receive a fourth amount of heat energy from the energy source and may generate a fourth amount of useful energy. The sum of the first amount of useful energy, the second amount of useful energy, the third amount of useful energy and the fourth amount of useful energy may be equal to at least about 30% of the fourth amount of heat energy.

In another embodiment, the present invention provides a method for improving the efficiency of a power system having an energy source and a cooling system. The method has the steps of providing a working fluid; increasing the pressure of the working fluid; dividing the working fluid into multiple streams, including at least a first stream and a second stream; transferring a first amount of heat energy from the cooling system to the first stream; extracting a first amount of useful energy from the first stream; transferring a second amount of heat energy from the energy source to the second stream; extracting a second amount of useful energy from the second stream; and cooling the working fluid to a minimum pressure, the minimum pressure being approximately equal to or below the vapor pressure of the working fluid at an ambient air temperature.

In this embodiment, the second stream may comprise a primary second stream and a secondary second stream, and the step of transferring a second amount of heat energy from the energy source to the second stream may include transferring the second amount of heat energy from the energy source to the primary second stream, and transferring a portion of the second amount of heat energy from the primary second stream to the secondary second stream. Also in this embodiment, the step of extracting a second amount of useful energy from the second stream may include extracting a first portion of the second amount of useful energy from the primary second stream, and extracting a second portion of the second amount of useful energy from the secondary second stream. In this embodiment, the power system may be a steam power generation system.

In still another embodiment, the present invention provides a method for generating energy. In this embodiment, the method includes the steps of: providing a first working fluid; increasing the pressure of the first working fluid; transferring a first amount of heat energy from an energy source to the first working fluid; extracting a first amount of useful energy from the first working fluid; providing a second working fluid; increasing the pressure of the second working fluid; dividing the second working fluid into multiple streams, including at least a first stream and a second stream; transferring a second amount of heat energy from the first working fluid to the first stream; extracting a second amount of useful energy from the first stream; transferring a third amount of heat energy from the energy source to the second stream; extracting a third amount of useful energy from the second stream; and cooling the second working fluid to a minimum pressure, the minimum pressure being approximately equal to or below the vapor pressure of the second working fluid at an ambient air temperature.

In this embodiment, the second stream may have a primary second stream and a secondary second stream, and the step of transferring a third amount of heat energy from the energy source to the second stream may include the steps of transferring the third amount of heat energy from the energy source to the primary second stream, and transferring a portion of the third amount of heat energy from the primary second stream to the secondary second stream. Still further, in this embodiment, the step of extracting a third amount of useful energy from the second stream may include the steps of extracting a first portion of the third amount of useful energy from the primary second stream, and extracting a second portion of the third amount of useful energy from the secondary second stream. In this embodiment, the first working fluid may be water.

In yet another embodiment, the present invention provides a method for improving the efficiency of a power system having an energy source and a cooling system. The method of this embodiment includes: providing a working fluid; increasing the pressure of the working fluid; dividing the working fluid into a first stream a second stream and a third stream; transferring a first amount of heat energy from the cooling system to the first stream; extracting a first amount of useful energy from the first stream; transferring a second amount of heat energy from the energy source to the second stream; extracting a second amount of useful energy from the second stream; transferring a third amount of heat energy from the second stream to the third stream; extracting a third amount of useful energy from the third stream; and cooling the working fluid to a minimum pressure, the minimum pressure being approximately equal to or below the vapor pressure of the working fluid at an ambient air temperature.

In this embodiment, the step of transferring a second amount of heat energy from the energy source to the second stream may include transferring a first portion of the second amount of heat energy from the energy source to the second stream in a first heat exchanger, and transferring a second portion of the second amount of heat energy from the energy source to the second stream in a second heat exchanger. Also in this embodiment, the step of extracting a first amount of useful energy from the first stream may include expanding the first stream in a first expander, the step of extracting a second amount of useful energy from the second stream may include expanding the second stream in a second expander, and the step of extracting a third amount of useful energy from the third stream may include expanding the third stream in a third expander. In this embodiment, the power system may be a steam power generation system.

In still another embodiment, the present invention provides an apparatus for generating supplemental energy from a power system having an energy source and a cooling system. The apparatus of this embodiment has the features of: multiple fluid conduits, including at least a first fluid conduit, a second fluid conduit, and a combined fluid conduit, the multiple fluid conduits being adapted to contain a working fluid; one or more pumps operatively attached to the multiple fluid conduits and adapted to pressurize the working fluid; a first heat exchanger operatively attached to the first fluid conduit and adapted to allow a first amount of heat energy to transfer from the cooling system to the working fluid in the first fluid conduit; a first fluid expander operatively attached to the first fluid conduit and adapted to extract a first amount of useful energy from the working fluid in the first fluid conduit; a second heat exchanger operatively attached to the second fluid conduit and adapted to allow a second amount of heat energy to transfer from the energy source to the working fluid in the second fluid conduit; a second fluid expander operatively attached to the second fluid conduit and adapted to extract a second amount of useful energy from the working fluid in the second fluid conduit; and a cooling device operatively attached to at least one of the multiple fluid conduits and adapted to reduce the working fluid to a minimum pressure, the minimum pressure being approximately equal to or below the vapor pressure of the fluid at an ambient temperature. The first fluid conduit and the second fluid conduit join at one or more merge points to form the combined fluid conduit.

In this embodiment, the multiple fluid conduits may further include a third fluid conduit, and the apparatus may further have a third heat exchanger operatively attached to the second fluid conduit and the third fluid conduit and adapted to transfer a third amount of heat energy from the working fluid in the second fluid conduit to the working fluid in the third fluid conduit and a third fluid expander operatively attached to the third fluid conduit and adapted to extract a third amount of useful energy from the working fluid in the third fluid conduit. In this embodiment, the third heat exchanger may be located, relative the second fluid conduit, after the second fluid expander. Also in this embodiment, the second heat exchanger may be two heat exchangers. Still further, in this embodiment the power system may receive a fourth amount of heat energy from the energy source and may generate a fourth amount of useful energy. The sum of the first amount of useful energy, the second amount of useful energy, the third amount of useful energy and the fourth amount of useful energy may be equal to at least about 30% of the fourth amount of heat energy.

In still another embodiment, the present invention provides an apparatus for converting heat energy to useful energy. The apparatus includes a primary power system and a secondary power system. The primary power system has: an energy source; a primary fluid conduit adapted to contain a primary working fluid; a primary fluid pump operatively attached to the primary fluid conduit and adapted to pressurize the primary working fluid; a primary fluid heat exchanger operatively attached to the primary fluid conduit and adapted to allow a first amount of heat energy to transfer from the energy source to the primary fluid contained in the primary fluid conduit; and a primary fluid expander operatively attached to the primary fluid conduit and adapted to extract a first amount of useful energy from the primary working fluid in the primary fluid conduit. The secondary power system has: a secondary fluid conduit system comprising a first fluid loop, a second fluid loop, and a third fluid loop, the secondary fluid conduit system being adapted to contain a secondary working fluid; one or more secondary fluid pumps operatively attached to the secondary fluid conduit system and adapted to pressurize the secondary working fluid; a first heat exchanger operatively attached to the first fluid loop and the primary fluid conduit and being positioned, relative to the primary fluid conduit, between the primary fluid expander and the primary fluid pump, the first heat exchanger being adapted to allow a second amount of heat energy to transfer from the primary fluid in the primary working fluid conduit to the secondary working fluid in the first fluid loop; a first fluid expander operatively attached to the first fluid loop and adapted to extract a second amount of useful energy from the secondary working fluid in the first fluid loop; a second heat exchanger operatively attached to the second fluid loop and adapted to allow a third amount of heat energy to transfer from the energy source to the secondary working fluid in the second fluid loop; a second fluid expander operatively attached to the second fluid loop and adapted to extract a third amount of useful energy from the secondary working fluid in the second fluid loop; a third heat exchanger operatively attached to the second fluid loop and the third fluid loop and being located, relative the second fluid loop, after the second fluid expander, the third heat exchanger being adapted to allow a fourth amount of heat energy to transfer from the secondary working fluid in the second fluid loop to the secondary working fluid in the third fluid loop; a third fluid expander operatively attached to the third fluid loop and adapted to extract a fourth amount of useful energy from the secondary working fluid in the second fluid loop; and a cooling device operatively attached to the secondary fluid conduit system and adapted to reduce the secondary working fluid to a minimum pressure, the minimum pressure being approximately equal to or below the vapor pressure of the secondary working fluid at an ambient temperature.

In this embodiment, the primary working fluid may be water. Also in this embodiment, the sum of the first amount of useful energy, the second amount of useful energy, the third amount of useful energy and the fourth amount of useful energy may be equal to at least about 30% of the first amount of heat energy.

BRIEF DESCRIPTION OF THE DRAWINGS

The present invention may be more readily understood by reference to the accompanying drawings, which are briefly described as follows.

DETAILED DESCRIPTION OF THE PREFERRED EMBODIMENTS

Developing electricity in a more efficient manner is of paramount importance as energy sources are depleted and the pollution generated from the combustion of fossil fuels continues to harm the environment. The Cascading Closed Loop Cycle of the present invention provides a closed loop power generation system that may be used as a primary power source. With the CCLC, improved efficiency is provided by reducing the amount of energy lost to overcome the latent heat of vaporization of the power generation medium and more effectively capturing heat from available heat sources and converting this heat to useful energy. The Super Cascading Closed Loop Cycle (Super-CCLC) of the present invention offers a secondary power source that can be used in conjunction with conventional power systems to increase power generation efficiency by generating useful energy from the heat lost in the process of generating power using steam turbines or other conventional power systems. In the Super-CCLC, improved efficiency comes from recovering energy from the two sources of waste heat noted in the Background of the Invention. The first source is the recovery of the waste heat exiting the boiler and the second source is recovery of the waste heat discharged during the condensing process.

It can be shown thermodynamically that converting thermal energy to mechanical energy is performed particularly well with the Organic Rankine Cycle (ORC). The Super CCLC system is an ORC designed to convert the heat lost in the process of developing steam turbine power. U.S. patent application Ser. No. 10/199,257, filed on Jul. 22, 2002, which is incorporated herein by reference, describes a method to utilize an ORC cycle to generate useful power using propane, propylene, or an equivalent or similar light hydrocarbon medium, as the fluid medium in a Cascading Closed Loop Cycle (CCLC). As used herein, the term "fluid" means any material in a liquid, gaseous and/or vaporous state. Generally, the materials described herein as "fluids" will remain in a liquid, gaseous and/or vaporous state at all times, but it will be appreciated that such fluids may solidify under some circumstances, but typically not during the operation of the inventions described herein. The present invention further envisions using multiple integrated CCLC systems to simultaneously recover the waste heat exiting a steam boiler (or other heat source) and the waste heat from the steam condensing process (or similar process).

Various preferred embodiments of the present invention are now described in more detail with reference to the attached Figures.

Figure 1:
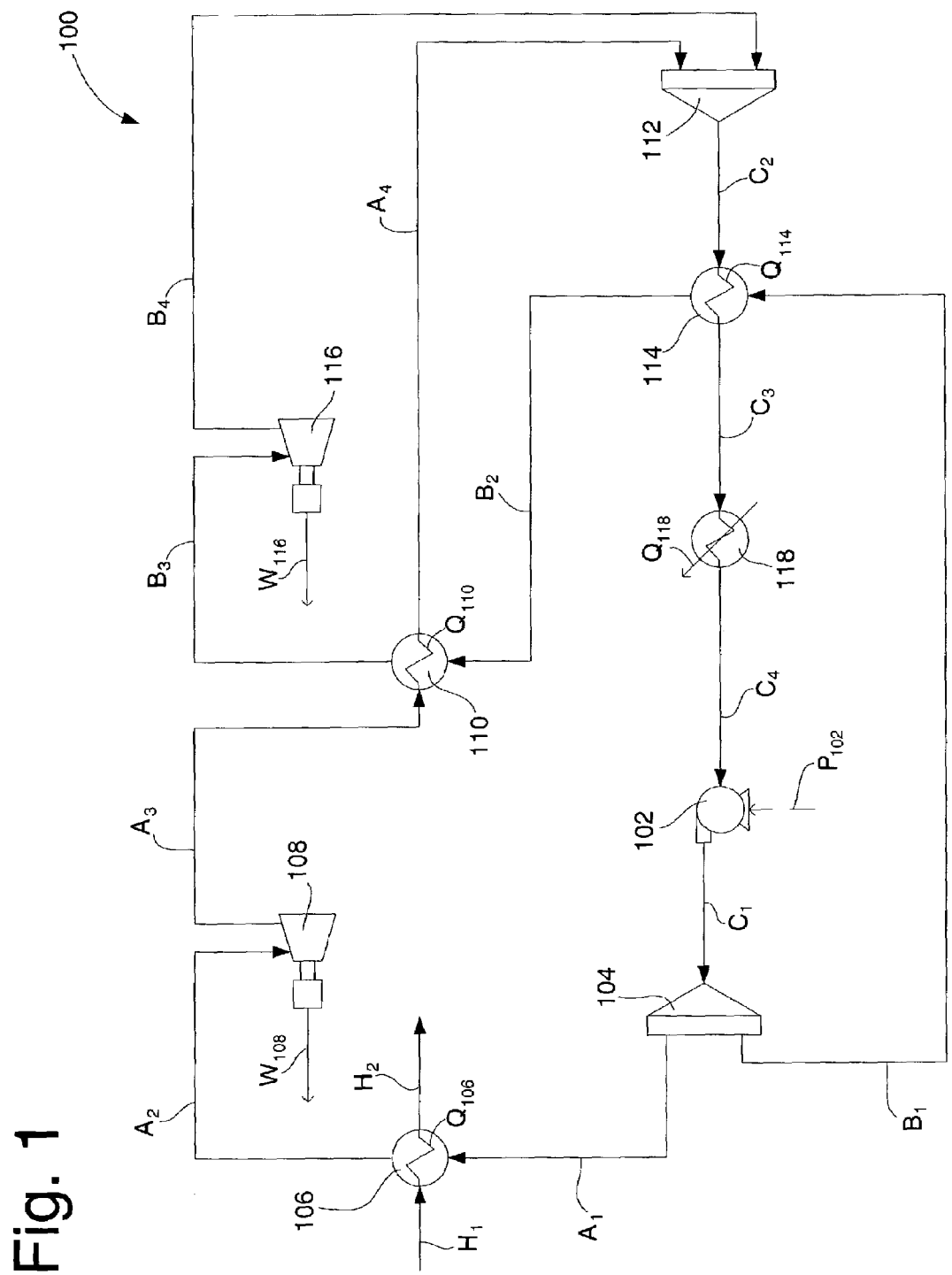
FIG. 1 is schematic diagram of an embodiment of a cascading closed loop cycle (CCLC) power generation system of the present invention.

In one embodiment, the present invention utilizes a unique arrangement and method for operating a Cascading Closed Loop Cycle (CCLC) to extract additional efficiency from energy sources. The Cascading Closed Loop Cycle (CCLC) is a hermitically sealed closed loop process. As shown in FIG. 1, the CCLC 100 has a primary fluid stream, which is generally designated by the letter A, a secondary fluid stream, B, and a combined fluid stream C. The combined fluid stream C comprises essentially the entire supply of the power generation medium, which preferably comprises a light hydrocarbon material, and more preferably comprises propylene, propane or a combination of these materials. Primary fluid stream A and secondary fluid stream B comprise portions of the combined fluid stream C that have been divided by a stream separator 104.

The CCLC 100 begins at a high pressure pump 102 that pumps the combined fluid stream C, in a liquid state, to the desired initial pressure. (Because this is a closed loop system in which the cycle continually recirculates, there is technically no point at which the system "begins," so the selection of this point as the beginning point is arbitrary and made solely for clarity of explanation.) At this point, the combined fluid stream C has certain physical properties (pressure, temperature and mass flow rate), defined herein as state $C_1$. State $C_1$ and other states of the fluid streams at various points in the process are described in more detail elsewhere herein. The combined fluid stream C is then divided to become the primary fluid stream A, having state $A_1$, and the secondary fluid stream B, having state $B_1$, by a stream separator 104. The various states described herein are approximations, and although a portion of the apparatus is designated as having a single state, that state may have variations in temperature, pressure and so on caused by friction, local heating or cooling, fluid dynamics, and so on.

The primary fluid stream A is routed to a primary indirect heat exchanger 106, where the primary fluid stream A is vaporized by exposure to a heat or energy source. The heat or energy source can be any available source of heat, such as combustion of fossil fuels or hydrogen, nuclear reactions, solar heat, fuel cells, geothermal energy, waste heat, and so on. In addition, the heat source can be excess heat from other industrial operations. Non-limiting examples of such heat sources are: heat from smelters, chemical processing and refining systems, drying systems, kilns and ovens, boilers, heaters and furnaces, gas turbines, and so on. The amount of heat transferred to the primary fluid stream is identified as $Q_{106}$. In FIG. 1, the heat source is a flow of air (flue gas) heated by burning fossil fuel, and is generally designated by the letter H. Flue gas H enters the primary indirect heat exchanger 106 at state $H_1$, and exits at state $H_2$. Flue gas H leaving the primary indirect heat exchanger 106 may be released to the atmosphere through a smoke stack or the like. Of course, any type of heat exchanging device may be used for primary indirect heat exchanger 106, or any other heat exchanger, cooler, condenser, etc. described herein. The selection of the particular heat exchanging device may depend on the type of heat source being used. For example, in various embodiments the heat exchanging device may be an air-to-liquid heat exchanger, a water tube boiler, a shell (fire tube boiler), or the like. The selection and use of such devices is known in the art.

Once vaporized, the primary fluid stream A is at state $A_2$. The primary fluid stream is then expanded in a primary expansion turbine 108 (preferably a turbo-expander) until it reaches state $A_3$, thereby creating a first supply of useful energy $W_{108}$. Once expanded, the primary fluid stream A is routed to a secondary indirect heat exchanger 110, where the primary fluid stream A adds heat to the secondary fluid stream B, and exits at state $A_4$. The heat transfer between the primary and secondary fluid streams is identified as $Q_{110}$. Finally, the primary fluid stream A is discharged into a stream mixer 112, where it is combined with the secondary fluid stream B. The combined primary and secondary fluid streams become the combined fluid stream C, which is at state $C_2$.

The secondary indirect heat exchanger 110 superheats the secondary fluid stream B by using heat remaining in the vaporized fluid of primary fluid stream A after it exits the primary expansion turbine 108. The secondary fluid stream B enters the secondary indirect heat exchanger 110 at state $B_2$, and exits at state $B_3$. The secondary fluid stream B having state $B_3$ is then directed to a secondary expansion turbine 116 for generating a second supply of useful energy $W_{116}$. The secondary fluid stream changes to state $B_4$ as it passes through the secondary expansion turbine 116. The secondary fluid stream B is then combined with the primary fluid stream A in the stream mixer 112 to form the combined fluid stream C, as previously explained. The combined fluid stream C is then directed to a tertiary indirect heat exchanger 114 where heat in the combined fluid stream C is transferred to the secondary fluid stream B, causing the secondary fluid stream B to change from state $B_1$ to state $B_2$, and causing the combined fluid stream to change from state $C_2$ to state $C_3$. The amount of heat transferred from the combined fluid stream to the secondary fluid stream is identified as $Q_{114}$. After exiting the tertiary indirect heat exchanger 114, the combined fluid stream C is directed to a condenser 118 where the combined fluid stream C is condensed to a liquid having state $C_4$. Heat, in the amount of $Q_{118}$ is extracted from the combined fluid stream C by the condenser 118 and absorbed by any suitable cooling medium, such as water or air. Once the fluid of the combined fluid stream C is condensed back to a liquid state, it is directed to the high pressure pump 102 to begin the cycle anew. Pump 102 requires a certain amount of power $P_{102}$ to pressurize the combined fluid stream C to the desired state $C_1$.

The primary expansion turbine 108 and secondary expansion turbine 116 may be connected in series or parallel to an energy generation device using any speed changing means to produce mechanical or electrical energy. Alternatively, one or both of the expansion turbines may be attached to compressors, pumps, electrical generators or other devices that may be used to provide additional useful energy or work. Furthermore, the CCLC of FIG. 1 may be modified within the basic idea to include additional heat exchangers, condensers, pumps or expansion turbines. Pumps, stream separators, heat exchangers, expansion turbines, turbo-expanders, condensers and equivalent and alternative devices are well known in the art. Furthermore, techniques and devices for attaching these various devices are also known in the art.

Figure 2:
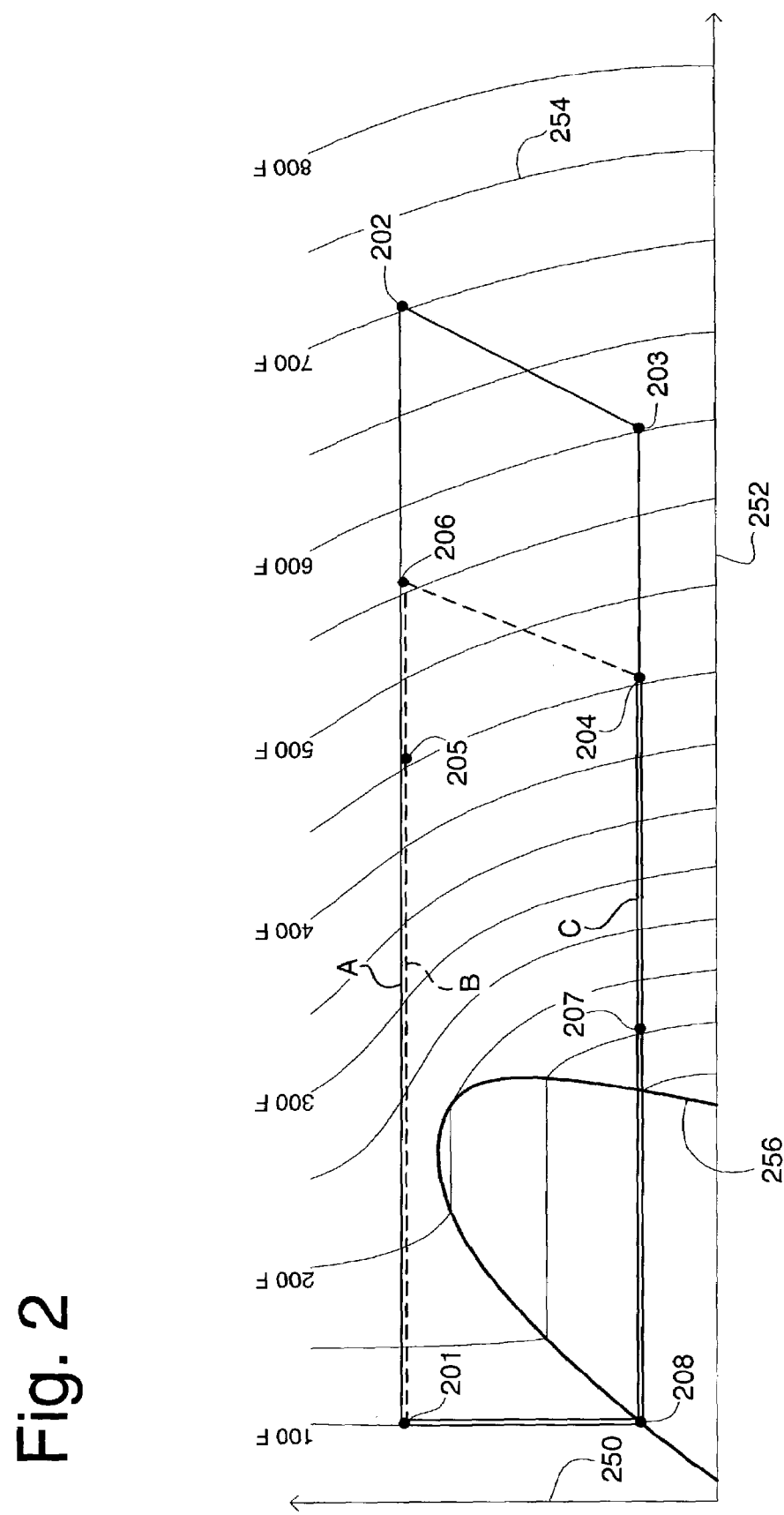
FIG. 2 is a Mollier diagram of the power cycle of the CCLC of FIG. 1.

The Cascading Closed Loop Cycle of the present invention is now further explained with reference to FIG. 2, which is a Mollier (i.e., pressure vs. enthalpy) diagram for the CCLC power generation cycle. In FIG. 2, pressure is represented by the vertical axis 250, enthalpy (i.e., BTU per pound) is represented by the horizontal axis 252, and numerous isotherms 254 are depicted, along with the saturation curve 256 of the working fluid. The working fluid in the embodiment of FIG. 2 preferably is propane. Also in FIG. 2, the combined fluid stream C of FIG. 1 is depicted as double line C, the primary fluid stream A is depicted as single line A, and the secondary fluid stream B is depicted as dashed line B. For clarity, the lines representing the fluid streams have been separated in some locations to be clearly distinguishable from one another. Also for clarity, each of the points on FIG. 2 symbolically represents the temperature and pressure of one or more of the states (e.g., state C1, state C2, state A1, state B1, etc.) described above with reference to FIG. 1. For clarity, single points are used, however one of ordinary skill will readily recognize that the various states represented by each point may be located apart from one another in actual practice.

The CCLC of FIG. 2 begins, for the purposes of this discussion, at point 201 (corresponding to states $A_1$, $B_1$ and $C_1$), at which point the combined fluid stream C has been pressurized by the high pressure pump 102 and divided into separate streams. States $C_1$, $A_1$ and $B_1$ are approximately the same, with some differences being attributable to pumping losses, friction, and the like. Beginning from point 201, the first fluid stream A and second fluid stream B are processed along separate paths. The first fluid stream A is heated at an approximately constant pressure to point 202 (state $A_2$) by absorbing heat from the flue gas H in the primary indirect heat exchanger 106. The first fluid stream A is then expanded, essentially along a line of constant entropy (not shown), in the primary expansion turbine 108 until it reaches point 203 (state $A_3$). Next, the first fluid stream A is cooled at an approximately constant pressure to point 204 (state $A_4$) by releasing heat to the secondary fluid stream B in the secondary indirect heat exchanger 110. At this point, the primary fluid stream A is mixed with the secondary fluid stream B to once again become the combined fluid stream C.

The secondary fluid stream B also begins at point 201 (representing state $B_1$), and is heated at an approximately constant pressure to point 205 (state $B_2$) by absorbing heat from the combined fluid stream C in the tertiary indirect heat exchanger 114. Next, the secondary fluid stream B is heated at an approximately constant pressure to point 206 (state $B_3$) by absorbing heat from the primary fluid stream A in the secondary indirect heat exchanger 110. The secondary fluid stream B is then expanded, essentially along a line of constant entropy (not shown), in the secondary expansion turbine 116 until it reaches point 204 (state $B_4$), where it is mixed with the primary fluid stream A to form the combined fluid stream C.

Once combined, the combined fluid stream C is cooled at an approximately constant pressure to point 207 (state $C_3$) by releasing heat to the secondary fluid stream B in the tertiary indirect heat exchanger 114, as noted above. The combined fluid stream C is then cooled even further by the condenser 118 until it reaches point 208 (state $C_4$). Again, the cooling from point 207 to point 208 occurs at a relatively constant pressure. After the combined fluid stream is cooled to a liquid state, the high pressure pump 102 pumps it, at a relatively constant temperature, to point 201 (state $C_1$) to begin the cycle anew.

By carefully selecting and controlling the various states of the fluid streams, the present invention may be used to provide extremely efficient power generation when compared to conventional steam power generation systems. Table 1 provides approximate values for a preferred embodiment of the various states identified in FIG. 1, as well as other data related to the operation of the preferred embodiment. The working fluid in Table 1 is propane. While the data provided in Table 1 and elsewhere herein represents certain preferred embodiments of the invention, it will be understood that these values may be changed significantly or adapted to particular operating systems or operating requirements without leaving the scope and spirit of the invention.

TABLE 1

CCLC (FIG. 1)

Fluid States (Properties) 132,

| | Temperature (F) | Pressure (psia) | Flow Rate (lb/hr) |
|---|---|---|---|
| $H_1$ | 750 | 24.7 | 833,300 |
| $H_2$ | 132 | 14.7 | 833,300 |
| $C_1$ | 110 | 770 | 706,800 |
| $C_2$ | 464 | 204 | 706,800 |
| $C_3$ | 156 | 199 | 706,800 |
| $C_4$ | 100 | 189 | 706,800 |
| $A_1$ | 110 | 770 | 304,400 |
| $A_2$ | 700 | 765 | 304,400 |
| $A_3$ | 608 | 209 | 304,400 |
| $A_4$ | 464 | 204 | 304,400 |
| $B_1$ | 110 | 770 | 402,400 |
| $B_2$ | 454 | 765 | 402,400 |
| $B_3$ | 558 | 760 | 402,400 |
| $B_4$ | 464 | 204 | 402,400 |

Heat Transfer Rates

BTU/hr

| | |
|---|---|
| $Q_{106}$ | 146,300,000 |
| $Q_{110}$ | 29,040,000 |
| $Q_{114}$ | 122,700,000 |
| $Q_{118}$ | 114,300,000 |

TABLE 1-continued

CCLC (FIG. 1)

Power

BTU/hr

| | |
|---|---|
| $W_{108}$ | 17,013,000 |
| $W_{116}$ | 19,291,000 |
| $P_{102}$ | −4,301,000 |
| NET | 32,003,000 |

Efficiency: 21.9%

The efficiency of the embodiment of the CCLC provided in Table 1 is calculated as the net power ($W_{108}+W_{116}-P_{102}$) divided by the amount of heat entering the system from the heat source ($Q_{106}$). It has been discovered that the efficiency of the present invention greatly exceeds the efficiency of conventional power systems. This greater efficiency can be used to increase power output or reduce resource consumption, and can be readily used to provide significant environmental benefits in the form of reduced emissions (both in the amount of pollutants and the thermal pollution caused by high-temperature exhausts) and increased resource conservation. Other benefits of this improved efficiency are too numerous to list, but will be readily grasped by those of ordinary skill in the art. In a preferred embodiment, the efficiency of the CCLC is at least about 17%, and more preferably at least about 20%. Furthermore, as can be seen in Table 1, it has been found that the efficiency of one preferred embodiment of the present invention is nearly 22%. This efficiency is significantly greater than the efficiency obtained by prior art steam power generation systems of comparable cost and complexity. An example of such a steam power generation system is provided in FIG. 3.

Figure 3:
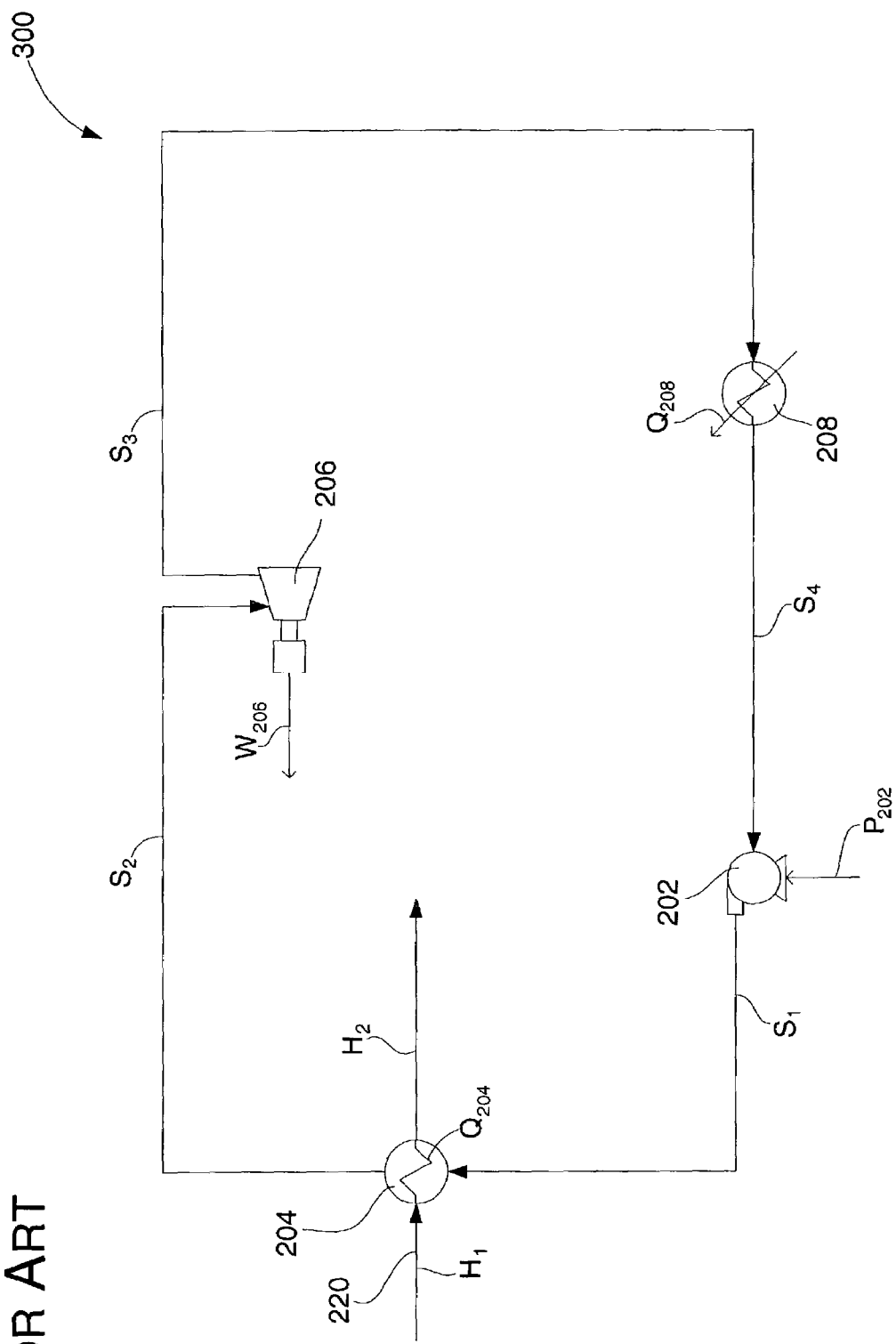
FIG. 3 is a schematic of a typical prior art steam power generating system.

In the prior art steam system 300 of FIG. 3, a water fluid flow, generally designated by the letter S, is circulated through the system 300. A pump 202 pressurizes the water fluid flow to state $S_1$. The pump 202 requires a certain amount of power $P_{202}$ to pressurize the water. The pressurized water is then heated and vaporized into steam having state $S_2$ in an indirect heat exchanger 204 by flue gas 220 or any other conventional heat source. The flue gas 220 enters the indirect heat exchanger 204 at state $H_1$, and exits at $H_2$, imparting heat in the amount of $Q_{204}$ to the water fluid flow S. The steam is then directed to an expansion turbine 206, where it is expanded to state $S_3$, thereby creating a supply of useful energy $W_{206}$. The steam is cooled in a condenser 208 or other type of cooler until it becomes a liquid having state $S_4$. During this cooling process, heat in the amount of $Q_{208}$ must be removed from the steam in order to condense it into a liquid. Table 2 shows typical optimized approximate values for the various states and other variables of the prior art steam system 300 of FIG. 3.

TABLE 2

Steam Cycle (FIG. 3) (Prior Art)

Fluid States (Properties) 132,

| | Temperature (F) | Pressure (psia) | Flow Rate (lb/hr) |
|---|---|---|---|
| $H_1$ | 750 | 24.7 | 833,300 |
| $H_2$ | 409 | 14.7 | 833,300 |

TABLE 2-continued

Steam Cycle (FIG. 3) (Prior Art)

| | | | |
|---|---|---|---|
| $S_1$ | 104 | 770 | 62,258 |
| $S_2$ | 730 | 765 | 62,258 |
| $S_3$ | 209 | 11 | 62,258 |
| $S_4$ | 100 | 1 | 62,258 |

Heat Transfer Rates

| | BTU/hr |
|---|---|
| $Q_{204}$ | 80,210,000 |
| $Q_{205}$ | 67,410,000 |

Power

| | BTU/hr |
|---|---|
| $W_{206}$ | 13,038,000 |
| $P_{102}$ | −237,100 |
| NET | 12,800,900 |

Efficiency: 16.0%

As shown in Table 2, the conventional steam cycle receives the same heat input as the CCLC demonstrated in FIGS. 1 and 2 and Table 1—both systems receive an 833,300 lb/hr supply of flue gas at 750 F and 24.7 psia as the heat source. However, the conventional steam cycle has an efficiency (($W_{206}$−$P_{102}$)/$Q_{204}$) of 16.0%, as compared to an efficiency of 21.9% for the CCLC. Thus, the CCLC provides about a 33% efficiency increase over conventional steam systems. This higher efficiency is provided despite the additional pumping energy required by the CCLC system due to the slightly compressible nature of liquid propane or equivalent light hydrocarbons.

The present invention is able to provide this remarkable increase in efficiency in part because it operates using propane or other light hydrocarbons as the operating fluid, rather than water. It has been discovered that propane has certain properties that provide numerous advantages over water when being used in a power generation cycle. In any power generation cycle, the working fluid (typically water) must be pumped while in a liquid state, heated to change it into a gas, further heated to impart greater energy to the gas, expanded (decompressed) to obtain useful energy, and cooled into a liquid to be pumped back into the cycle. As noted elsewhere herein, the amount of energy that is required to change the fluid from a liquid to a gas is essentially lost without being converted to useful energy. Advantageously, propane has a relatively low latent heat of vaporization (about $\frac{1}{7}^{th}$ that of water), so that it takes less energy to change the liquid propane into gaseous propane. This provides a substantial energy savings over conventional steam-based power systems.

The present invention also has other features that contribute to obtaining a relatively high efficiency. For example, it has been discovered that propane can be practically employed in a high-temperature power generation system by maintaining the propane at a minimum pressure of about 200 psia. This is the approximate pressure at which the propane condenses at room temperature (i.e., the vapor pressure of propane). By keeping the minimum pressure at or below the vapor pressure of the working fluid, the system may be operated in typical climactic conditions without requiring active cooling (i.e., refrigeration) to condense the working fluid into a liquid. In practice, it will be sufficient to establish the minimum pressure at approximately the vapor pressure of the working fluid for the given ambient temperature. Some variation in this pressure may be allowed to accommodate expected or unexpected fluctuations in the ambient temperature, to maximize the overall efficiency of the system, or for other reasons as will be apparent to those of ordinary skill in the art. The maximum pressure of the propane preferably can also be regulated. The pressure of the propane exiting the pump may be varied to optimize the turbo-expander expansion ratios with the energy available from the heat source and the work required to pump the fluid to a particular pressure. In a preferred embodiment, the maximum pressure of the propane is about 300 psia to about 1000 psia, although other pressures may be used depending on the circumstances. One of ordinary skill in the art will be able to optimize the propane pressure to obtain this or other objectives.

Another advantageous property of propane, provided by its lower heat of vaporization than water, is that it can be superheated (i.e., can recover more heat) to produce more excess energy for expanding in a turbine at temperature ranges between 100° F. to 1000° F. Indeed, propane can recover available heat at temperatures approaching normal ambient temperatures, allowing the CCLC to be used to generate power from low-temperature heat sources. As such, a CCLC of the present invention can be used in place of steam systems or other high-temperature systems, or in place of low-temperature ORC systems.

The high efficiency of the present invention is also provided in part by the unique cascading turbine arrangement in which successive turbines are operated by "cascading" the energy obtained from the heat source from one fluid stream to the next. Still further, the high efficiency of the present invention is also provided, in part, by a unique tertiary indirect heat exchanger arrangement to preheat the secondary fluid stream, providing still greater increases in efficiency.

In addition to increased efficiency, the CCLC provides additional performance advantages over conventional steam systems. For instance, the efficiency of the CCLC is not adversely affected by altitude changes or variations in the pressure of the heat source (provided the heat source is of sufficient temperature to vaporize the propane) because the working fluid is hermetically sealed in its own environment. Of course, the heat source that powers the CCLC may be adversely affected by the altitude, leading to a corresponding reduction in power output—however the efficiency of the CCLC will remain substantially the same.

In addition, the power output of the CCLC increases as the ambient temperature decreases because as the ambient temperature decreases, the pressure at which the condensing begins also decreases. As such, when operating in a colder environment, the lower limit of the propane pressure can be reduced, while maintaining the remaining pressures of the propane at the same levels. As this is done, the pressure differential of the propane increases, and the expansion ratio of the turbo-expander can be increased to take advantage of the additional amount of energy available across this broader pressure range. This advantage may also be realized by using a colder condensing medium than ambient air. For example, if cold water (e.g., 40 degrees Fahrenheit) is used as the cooling medium to condense the propane into a liquid, the system may be modified to operate the turbo-expander at a lower backpressure to take advantage of the fact that the propane will condense at a correspondingly lower pressure. In contrast, conventional steam systems are largely temperature independent. This feature makes the CCLC system even more desirable for use in colder climates. Although it is anticipated that the present invention will be efficient when used without substantial modification at a wide range of ambient temperatures, it may be desirable to modify the minimum pressure of the propane (or other medium) to be approximately equal to or below vapor pressure of the propane at the particular ambient temperature of the power generation facility. Preferably, the ambient temperature is between about −50 degrees Fahrenheit to about 160 degrees Fahrenheit, and the minimum pressure is adjustable from about 25 psia to about 300 psia. Of course, these range limitations are not limiting, and the present invention may be readily modified to have pressures below or above these ranges to take advantage of the particular operating conditions expected for the system.

The CCLC of the present invention provides still other advantages. For example, a CCLC system of the present invention can be built at or below the cost of a conventional steam power generation system. This is because propane can be expanded using relatively inexpensive turbo-expanders, rather than expensive steam turbines. However, even if the construction cost of the CCLC exceeds that of a conventional power system, the higher efficiency of the CCLC also allows any excess manufacturing costs to be recaptured by lower operating costs and/or higher power output. Typical turbo-expanders that may be used with the present invention include those commercially available from GE Power Systems, ABB Alstom, Atlas Copco, Mafi Trench and GHH-Borsig. The turbo-expanders may be of any design, and in one embodiment, the turbo-expanders are centrifugal-type expanders.

The CCLC also offers numerous service benefits. Conventional steam systems require periodic cleaning and chemical treatment to prevent or reduce scale buildup caused by minerals in the water. Steam systems also may be run so that the steam obtains a negative vacuum relative to the atmosphere, which allows air and other contaminants to enter the system, reducing its efficiency. In typical steam systems, the water must be bled off to remove contaminants and replaced at regular intervals to maintain the system. This results in a large consumption of valuable water resources. In contrast a propane CCLC system can be hermetically sealed with relatively pure propane, requiring little cleaning or maintenance. Still further, the CCLC operates at lower waste heat discharge temperatures (i.e., the temperature at state $C_3$) than steam systems (i.e., the temperature at state $S_3$), which allows the CCLC to be cooled by natural water resources such as lakes and rivers while minimizing the amount of heat pollution created. The CCLC also operates entirely above atmospheric pressure, eliminating the possibility of contaminants leaking into the system, and eliminating the need to consume water resources to maintain the system. The CCLC also operates at the same pressure range as conventional systems, and therefore may be fabricated using conventional construction techniques and plumbing technology.

In another embodiment, the present invention may be used in conjunction with a conventional steam system or any other source of heat. In this embodiment, the present invention comprises a Super Cascading Closed Loop Cycle (Super-CCLC) for converting waste heat into usable power. In one embodiment, the Super-CCLC system develops power in a cascading expansion turbine arrangement using propane, or an equivalent light hydrocarbon medium, by converting the waste heat from the boiler exhaust and the waste heat from the condensing process into useful output as long as the temperature of these heat sources are high enough to vaporize propane. The present invention consists of one or more indirect heat exchangers, expansion turbines, stream mixers; condensing units; pumps; and stream separators operating in conjunction with a steam boiler and steam turbine. In the event the steam turbine is a vacuum design, the steam turbine preferably is modified to operate as a back pressure steam turbine with the back pressure controlled at about 25 psia with the vacuum condensing system being modified, eliminated or bypassed. A propane-to-steam heat exchanger would be installed in place of the vacuum condenser to absorb the latent heat of vaporization in the steam as the steam is condensed to water.

The air exhaust from the steam boiler is directed to an air-to-propane heat exchanger and the exhaust from the steam turbine to a steam-to-propane condenser. The waste heat exiting the steam boiler vaporizes propane that has been pressurized using one or more pumps. The heat from the steam turbine exhaust vaporizes a liquid propane stream that has been pressurized using one or more pumps. The pressurized liquid propane streams are vaporized in multiple indirect heat exchangers and expanded in multiple turbo-expanders. The exhaust heat from the turbo-expanders can be used to recover additional heat using propane-to-propane heat exchangers. The turbo-expanders can be connected in series or in parallel to multiple power generation devices such as a generator, pump or compressor using any speed changing means. Power generation devices, such as electrical generators, and the equipment used to attach them to turbo-expanders, turbines and the like are well known in the art.

Figure 4:
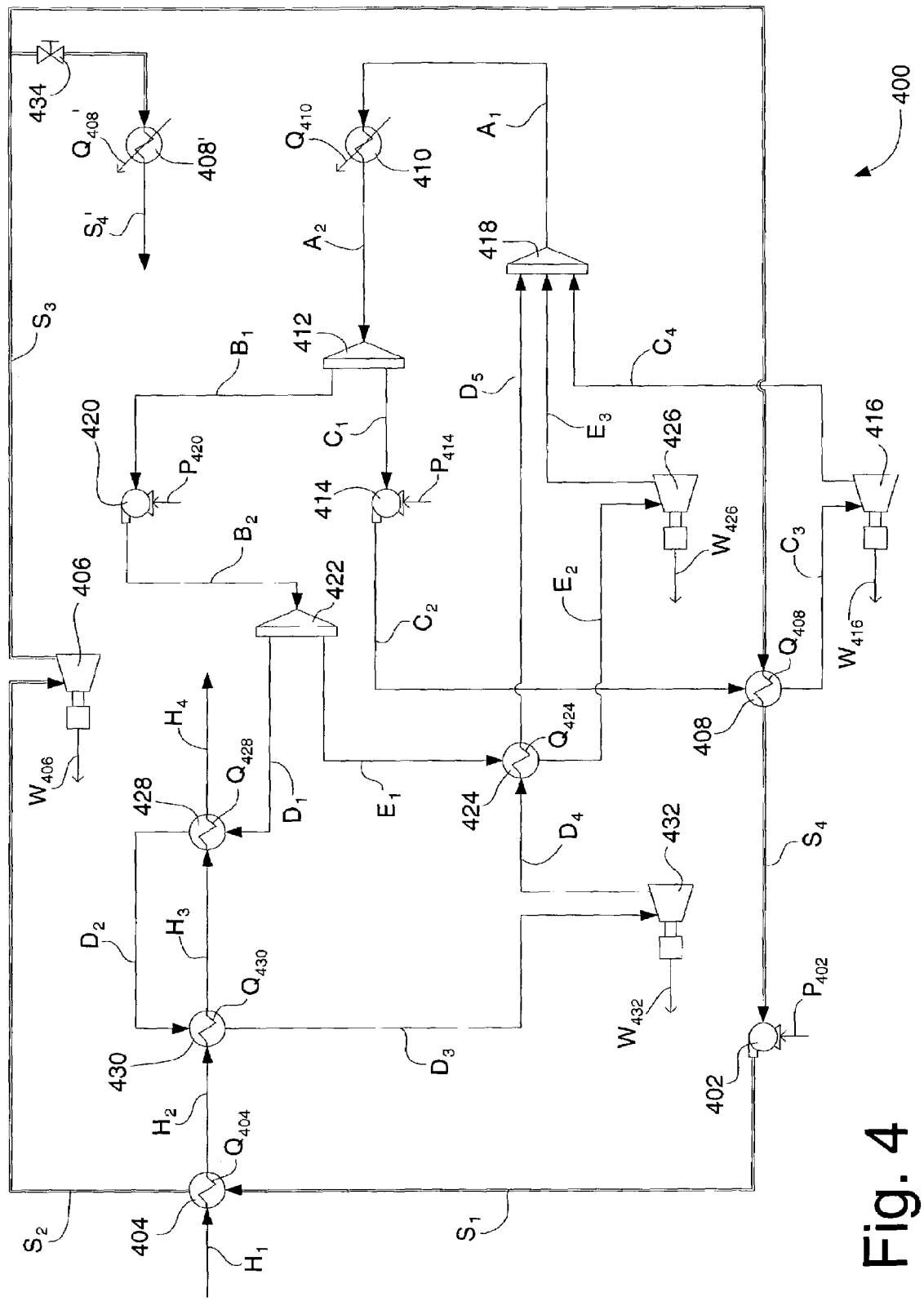
FIG. 4 is schematic diagram of an embodiment of a super cascading closed loop cycle (Super-CCLC) power generation system of the present invention.

An embodiment of a Super-CCLC system is schematically depicted in FIG. 4. The Super-CCLC system 400 of FIG. 4 comprises a steam loop, shown by the double line and generally designated by the letter S, and a multi-loop CCLC system, shown by single lines and generally designated by the letters A through E. Although the Super-CCLC 400 of FIG. 4 is shown in operation with a steam loop, the Super-CCLC arrangement of the present invention also may be operated with other types of power generation systems and heat sources. Indeed, various embodiments of the Super-CCLC may be adapted to generate power from waste heat generated by any number of devices or systems, including those sources of heat described above, or any other heat source. Furthermore, the embodiments of the Super-CCLC (or CCLC) of the present invention may be made having various different sizes, and may be large enough to provide substantial power generation for utilities, or compact enough to act as portable power generators or to provide motive and/or auxiliary power for automobiles, trucks, trains, ships, aircraft and the like.

The operation of the steam loop of FIG. 4 begins when a water pump 402 pressurizes a water stream S to state $S_1$. The water pump 402 requires a certain amount of power $P_{402}$ to pressurize the water stream S. The pressurized water stream S is heated in a boiler 404 from state $S_1$ to state $S_2$ by a heat source, such as flue gas (generally designated by the letter H), entering the boiler at state $H_1$, and exiting at state $H_2$. The amount of heat absorbed by the water stream S is designated herein as $Q_{404}$. The water stream S, which is a superheated steam at state $S_2$, is then directed to a steam turbine 406, where the water stream S is expanded to state $S_3$, generating an amount of useful energy $W_{406}$ in the process. The water steam S is then passed through a first indirect heat exchanger 408, where heat $Q_{408}$ is transferred to a first loop stream C of the CCLC portion of the Super-CCLC system 400 (as described below). Preferably, the heat transfer out of the water stream S in the first indirect heat exchanger 408 causes the water stream S to partially or completely condense from a gaseous state (state $S_3$) to liquid at state $S_4$, however lesser amounts of heat transfer also may be used. A supplemental condenser (not shown) may be provided after the first indirect heat exchanger 408 to provide additional cooling to the water stream S to more fully condense it to a liquid. At this point, the water stream S is directed back to the water pump 402 to begin the cycle anew.

In one embodiment of the invention, the steam loop may be provided with a bypass system that allows it to be operated as a conventional steam power system. This may be desirable, for example, when it is desired to update, modify or service the CCLC portion of the system. In such an embodiment, one or more bypass valves 434 may be provided to redirect the water stream through a condenser 408', rather than the first indirect heat exchanger 408, and then to the water pump 402 to restart the cycle. In such an embodiment, the condenser 408' extracts heat $Q_{408}'$ from the water to bring it to state $S_4'$. Of course, other valves (not shown) may be provided to fully reroute the water stream S, as will be understood by those of ordinary skill in the art. This bypass route can also be used during initial startup of the CCLC.

The multi-loop CCLC portion of the Super-CCLC system 400 comprises three loops that originate from a main combined fluid stream A or multiple combined streams. In a preferred embodiment, the operating fluid comprising the fluid stream is propane or another light hydrocarbon. The main combined fluid stream A is divided into a secondary combined fluid stream B and a first loop stream C. The secondary combined fluid stream B, in turn, is divided into a second loop stream D and a third loop stream E. Useful energy is extracted from each of the first, second and third loop streams (C, D and E), and then they are recombined to again form the main combined fluid stream A and start the process anew. Although it is preferred for the fluid in the loop streams to commingle when they are combined, it is also anticipated that the loop streams (or the various streams of any other embodiment of the invention) may instead be isolated from one another at all times, in which case separate pumps will be required for each fluid stream. The processes by which the first, second and third loop streams create useful energy are now described in more detail.

The first loop stream C begins at state $C_1$, at which point it is preferably a liquid. The first loop stream C is compressed to state $C_2$ by a first high pressure pump 414. This pumping process requires a certain amount of work input $P_{414}$. The first loop stream C is then directed to the first indirect heat exchanger 408, where it absorbs energy in the amount of $Q_{408}$, and becomes a vapor at state $C_3$. The first loop stream C then enters a first turbo-expander 416 where it expands to state $C_4$, and drives the turbo-expander 416 to produce useful energy $W_{416}$. The expanded first loop stream C is then mixed in a stream mixer 418 with the second and third loop streams (D and E), each of which is at the end of its respective cycle as described below, to form the main combined fluid stream A. As can be seen from FIG. 4, the first loop stream C receives heat primarily from the waste heat $Q_{408}$ from the steam loop S. Normally this heat is entirely lost without producing any useful work, but with the Super-CCLC, it is partially converted to useful energy, thereby improving on the efficiency of the unmodified system.

In the embodiment of FIG. 4, the secondary combined fluid stream B is pressurized from state $B_1$ to state $B_2$ by a second high pressure pump 420. This process requires an input of a certain amount of work $P_{420}$. After being pressurized, the secondary combined fluid stream B is divided into the second loop stream D and the third loop stream E by a second stream separator 422. Using the depicted arrangement, a single pump can be used to pressurize both the second and third loop streams. In other embodiments, the second and third loop streams may be pressurized separately, or the first, second and third loop streams may be pressurized by a single pump or set of pumps before being divided into respective loop streams. Of course, other pump configurations may be used. Ideally, the pumping configuration is selected to minimize the amount of work required to pump the fluids and reduce the overall cost of the system. The pump configuration may be based on such factors as: the desired flow rates of the streams, the pumping efficiency of various capacity pumps, and the costs of various capacity pumps. The pumping configuration also may be influenced by the desired pressures of the various loop streams, with streams having the same or similar desired pressures being pumped by the same pumps or set of pumps. One of ordinary skill in the art will be able to perform this optimization for the various embodiments of the present invention without undue experimentation.

The second loop stream D begins at state $D_1$, preferably as a pressurized fluid, as it emerges from the stream separator 422. As shown in FIG. 4, The second loop stream D is heated by the flue gas H (or any other heat source) exiting the steam loop boiler 404. As noted previously, in prior art systems, the energy contained in the flue gas exhaust is normally lost without receiving any substantial benefit from it. However, in the Super-CCLC, one or more heat exchangers may be employed to transfer heat from the flue gas H to the second loop stream D. In the embodiment of FIG. 4, two heat exchangers are used. The second loop stream D is preheated in a second indirect heat exchanger 428, where it changes from state $D_1$ to state $D_2$ as it absorbs heat in the amount of $Q_{428}$ from the flue gas H. This heat transfer cools the flue gas H from state $H_3$ to state $H_4$. The second loop stream D is further heated by the flue gas H in a third indirect heat exchanger 430, where it receives heat in the amount of $Q_{430}$ and exits at state $D_3$. This heat exchange cools the flue gas H from state $H_2$ to state $H_3$. Next, the second loop stream D is directed to a second turbo-expander 432, where it is expanded to state $D_4$, thereby generating useful energy $W_{432}$. The expanded second loop stream D then passes through a fourth indirect heat exchanger 424, where it transfers heat to the third loop stream E, and is thereby cooled from state $D_4$ to state $D_5$. Finally, the second loop stream D is mixed in the stream mixer 418 with the first and third loop streams (C and E).

The third loop stream E emerges from the stream separator 422 at state $E_1$. The third loop stream E passes through the fourth indirect heat exchanger 424, where it absorbs heat in the amount of $Q_{424}$ from the second loop stream D. This heat exchange vaporizes the third loop stream E, bringing it to state $E_2$. Once vaporized, the third loop stream E is directed to a third turbo-expander 426, where it is expanded to state $E_3$, thereby creating useful energy $W_{426}$. Finally, the third loop stream E is mixed in the stream mixer 418 with the first and second loop streams (C and D).

As shown in FIG. 4, the first, second and third loop streams (C, D and E) are combined at their respective states (states $C_4$, $D_5$ and $E_3$) to form the primary combined fluid stream A, which equalizes at state $A_1$. The primary combined fluid stream A is passed through a condenser 410 to release heat in the amount of $Q_{410}$ to any suitable cooling medium, causing the primary combined fluid stream A to change to state $A_2$. State $A_2$ preferably is a liquid state to facilitate pumping. After being cooled in condenser 410, the primary combined fluid stream A is divided in a first stream separator 412 into the secondary combined fluid stream B, which is at state $B_1$, and the first loop stream C, which is at state $C_1$. From here, the process begins anew. As noted before, various different pump configurations may be used with the present invention, and other configurations of stream separators may be used to feed these different pump configurations.

One or more of the turbo-expanders 416, 426, 432 and steam turbine 406 can be connected in series or in parallel to multiple power generation devices such as generators, pumps or compressors using any speed changing means. Power generation devices, such as electrical generators, and the equipment used to attach them to turbo-expanders, turbines and the like are well known in the art.

Figure 5:
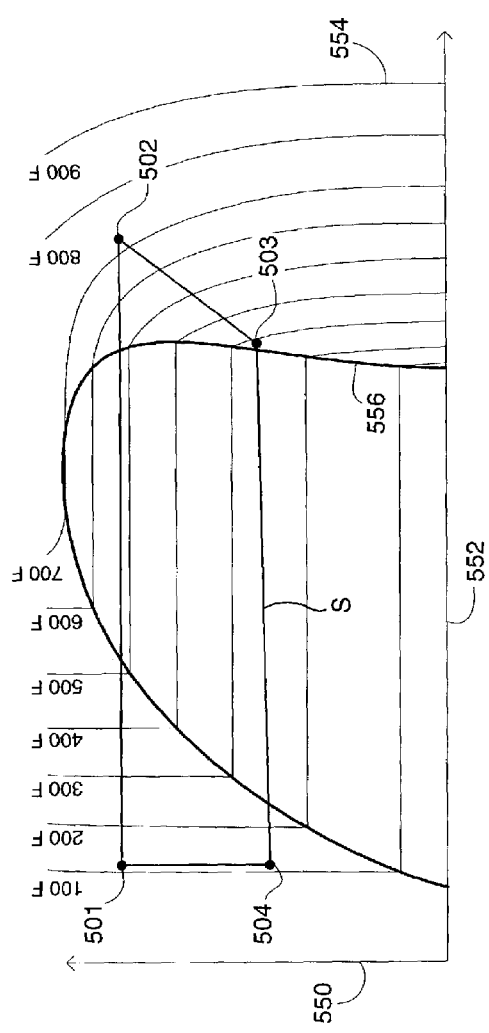
FIG. 5 is a Mollier diagram of the power cycle of the steam portion of the Super-CCLC of FIG. 4.
Figure 6:
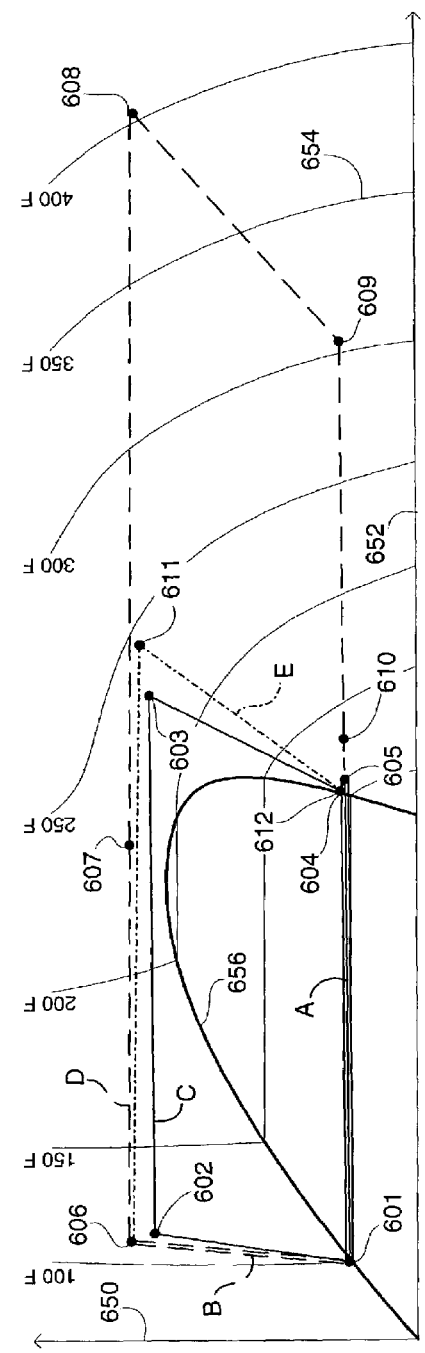
FIG. 6 is a Mollier diagram of the power cycle of the CCLC portion of the Super-CCLC of FIG. 4.

Referring now to FIGS. 5 and 6, the Super-CCLC process is described in further detail. FIGS. 5 and 6 are Mollier diagrams for the steam and CCLC portions of the Super-CCLC, respectively. In FIG. 5, pressure is represented by the vertical axis 550, enthalpy is represented by the horizontal axis 552, and numerous isotherms 554 are depicted, along with the saturation curve 556 for water. Similarly, in FIG. 6, pressure is represented by the vertical axis 650, enthalpy is represented by the horizontal axis 652, and numerous isotherms 654 are depicted, along with the saturation curve 656 for propane. In FIG. 5, the water stream S of FIG. 4 is depicted as line S. In FIG. 6, the primary combined fluid stream A of FIG. 4 is depicted as triple line A, the secondary combined fluid stream B is depicted as dashed double line B, the first loop stream C is depicted as solid line C, the second loop stream D is depicted as dashed line D, and the third loop stream E is depicted as broken line E. For clarity, the lines representing the fluid streams have been separated in some locations to be clearly distinguishable from one another. Also for clarity, each of the points on FIGS. 5 and 6 symbolically represents the temperature and pressure of one or more of the states (e.g., state A1, state B1, etc.) that are described above with reference to FIG. 4. Although single points may be used in these Figures for clarity, one of ordinary skill will readily recognize that the various states represented by each point may be located apart from one another in actual practice.

The Super-CCLC process of FIG. 4 begins, for the purposes of this discussion, at point 501, (corresponding to states $A_1$, $B_1$ and $C_1$), at which point the water stream S has been pressurized by the water pump 402 to state $S_1$. The water stream S is then heated at an approximately constant pressure to point 502 (state $S_2$) by absorbing heat $Q_{404}$ from the flue gas H in the boiler 404. From here, the water stream S is expanded in the steam turbine 406 essentially along a line of constant entropy (not shown) to point 503 (state $S_3$) to generate useful energy $W_{406}$. The water stream S is then cooled at a relatively constant pressure to point 504 (state $S_4$), during which time the water stream condenses from a gaseous state to a liquid state. During this cooling step, the enthalpy of the water stream S is reduced by transferring enthalpy (heat) from the water stream S to the first loop stream of the CCLC portion of the system, as shown in FIG. 4. Once cooled, the water pump 402 pumps the water stream S at a relatively constant temperature to point 501 (state $S_1$) to begin the cycle anew. The steam cycle shown in FIG. 5 is similar to steam cycles for conventional steam power systems, with the primary exception being the medium to which the heat $Q_{408}$ is extracted from the water stream S during cooling from point 503 to point 504.

The CCLC portion of the Super-CCLC begins, for purposes of this discussion, at point 601 (corresponding to states $A_2$, $B_1$, and $C_1$), where the primary combined fluid stream A is initially divided into the secondary combined fluid stream B and the first loop stream C, and the fluid streams are all in a liquid state. The first high pressure pump 414 compresses the first loop stream C at a relatively constant temperature to point 602 (state $C_2$). The first loop stream C is then heated and vaporized, at an approximately constant pressure, to point 603 (state $C_3$) by absorbing heat $Q_{408}$ from the first indirect heat exchanger 408. Once vaporized, the first loop stream C is expanded in turbo-expander 416 along a line of constant entropy (not shown) to point 604 (state $C_4$), thereby generating useful energy $W_{416}$. From point 604, the first loop stream C is mixed with the other loop streams to form the primary combined fluid stream A, at point 605 (state $A_1$).

Meanwhile, the second high pressure pump 420 compresses the secondary combined fluid stream B at a relatively constant temperature to point 606 (corresponding to states $B_2$, $D_1$ and $E_1$). At point 606, the secondary combined fluid stream B divides into the second loop stream D and third loop stream E, at states $D_1$ and $E_1$, respectively. From here, the second and third loop streams (D and E) are processed along separate paths. The second loop stream D is first heated to point 607 (state $D_2$) at an approximately constant pressure by flue gas H in the second indirect heat exchanger 428. The second loop stream D is then further heated to a vapor at point 608 (state $D_3$), again at an approximately constant pressure, by flue gas H in the third indirect heat exchanger 430. Next, the second loop stream D is expanded essentially along a line of constant entropy (not shown) in the second turbo-expander 432 until it reaches point 609 (state $D_4$), thereby creating useful energy $W_{432}$. As can be seen in FIG. 6, at point 609 the second loop stream D still contains a relatively large amount of internal energy, as shown by its relatively high enthalpy value. This energy is released to the third loop stream E in the fourth indirect heat exchanger 424, thereby cooling the second loop stream D, at a relatively constant pressure, to point 610 (state $D_5$). From here, the second loop stream D is mixed with the other loop streams to form the primary combined fluid stream A, at point 605 (state $A_1$).

Beginning from point 606, the third loop stream E is heated, at an approximately constant pressure, by the second loop stream D in the fourth indirect heat exchanger 424 until the third loop stream E reaches point 611 (state $E_2$), at which point it is a vapor. From here, the third loop stream E is expanded essentially along a line of constant entropy (not shown) in the third turbo-expander 426 to create useful energy $W_{426}$. The third loop stream E exits the third turbo-expander 426 at point 612 (state $E_3$), and is then mixed with the other loop streams to form the primary combined fluid stream A, at point 605 (state $A_1$).

After the three loop streams are combined to form the primary fluid stream A at point 605 (state $A_1$), the primary fluid stream is cooled in the condenser 410 at a relatively constant pressure until it is fully liquefied at point 601 (state $A_2$), where the process begins anew.

By carefully selecting and controlling the various states of the fluid streams, the present invention may be used to increase the efficiency of any conventional power system (including nuclear, steam or other power systems) or variations thereof. Table 3 provides approximate values for a preferred embodiment of the various states identified in FIGS. 4–6, as well as other data related to the operation of the preferred embodiment. The working fluid in this embodiment is propane. As with the data provided in Table 1, these values may be varied substantially depending on the particular operating circumstances or requirements or for other reasons, and any such variations are within the scope of the present invention.

TABLE 3

Super-CCLC (FIG. 4)

Fluid States (Properties) 132,

| | Temperature (F) | Pressure (psia) | Flow Rate (lb/hr) |
|---|---|---|---|
| $H_1$ | 750 | 34.7 | 833,300 |
| $H_2$ | 414 | 24.7 | 833,300 |
| $H_3$ | 241 | 19.7 | 833,300 |
| $H_4$ | 138 | 14.7 | 833,300 |
| $A_1$ | 110 | 199 | 832,800 |
| $A_2$ | 100 | 189 | 832,800 |
| $B_1$ | 100 | 189 | 372,700 |
| $B_2$ | 110 | 770 | 372,700 |
| $C_1$ | 100 | 189 | 460,100 |
| $C_2$ | 108 | 682 | 460,100 |
| $C_3$ | 231 | 677 | 460,100 |
| $C_4$ | 104 | 199 | 460,100 |
| $D_1$ | 110 | 770 | 229,500 |
| $D_2$ | 221 | 765 | 229,500 |
| $D_3$ | 404 | 760 | 229,500 |
| $D_4$ | 303 | 204 | 229,500 |
| $D_5$ | 128 | 199 | 229,500 |
| $E_1$ | 110 | 770 | 143,200 |
| $E_2$ | 245 | 760 | 143,200 |
| $E_3$ | 104 | 199 | 143,200 |

Heat Transfer Rates

| | BTU/hr |
|---|---|
| $Q_{404}$ | 79,100,000 |
| $Q_{408}$ | 68,310,000 |
| $Q_{410}$ | 114,900,000 |
| $Q_{424}$ | 21,350,000 |
| $Q_{428}$ | 22,860,000 |
| $Q_{430}$ | 39,440,000 |

Power

| | BTU/hr |
|---|---|
| $W_{406}$ | 11,035,000 |
| $W_{416}$ | 8,836,000 |
| $W_{426}$ | 2,970,000 |
| $W_{432}$ | 8,574,000 |
| $P_{402}$ | −234,000 |
| $P_{414}$ | −2,377,000 |
| $P_{420}$ | −2,270,000 |
| NET | 26,534,000 |

Efficiency: 33.5%

The efficiency of the embodiment of the Super-CCLC provided in Table 3 is calculated as the net power ($W_{406}$+$W_{416}$+$W_{426}$+$W_{432}$−$P_{402}$−$P_{414}$−$P_{420}$) divided by the amount of heat entering the steam system from the heat source ($Q_{404}$). In a preferred embodiment, the efficiency of the Super-CCLC is at least about 25%, and more preferably about 30%. Furthermore, as shown in Table 3, the efficiency of one preferred embodiment is about 33.5%, which is an increase of about 100% over the system if it were operated as a regular steam power generation system. The addition of the CCLC portion to the steam system may, in some cases, reduce the power generated by the steam turbine 406, but this loss in power is overcome by the additional power generated by the turbo-expanders 416, 426 and 432. Also, when modifying or designing a steam system to be a Super-CCLC system of the present invention, the steam portion of the system preferably is be operated as a backpressure system (i.e., wherein the water stream has a positive pressure at the exit of the steam turbine), and preferably is operated with at least about 25 psia of backpressure. This backpressure helps improve the overall efficiency by ensuring that sufficient heat is transferred to the first loop cycle C of the CCLC portion of the system to provide significant power generation by the first turbo-expander 416.

The present invention is not restricted to the embodiments presented above. The present invention can be modified within the scope and spirit of the invention to include additional heat exchangers, condensers, pumps, turbo-expanders, mixers or stream separators. Alternate arrangements and configurations can also be used to connect to and drive pumps, compressors, electrical generators and the like. Those of ordinary skill in the art will understand that the various devices described herein may be modified or replaced with equivalent devices or increased or decreased in number without leaving the scope and spirit of the invention. The data provided with reference to the preferred embodiments is also not intended to limit the invention, and the values provided for these variables in the attached tables and their relative relationships as shown in the attached Figures may be altered for any number of reasons to accommodate various operating conditions, operating requirements, and so on, as will be readily understood by those of ordinary skill in the art. The preferred embodiments described herein are exemplary only and are not intended to limit the scope of the invention in any way, which is limited only by the following claims.

We claim:

1. A method for generating energy, the method comprising:
   providing a working fluid;
   increasing the pressure of the working fluid;
   dividing the working fluid into multiple streams, including at least a first stream and a second stream;
   transferring a first amount of heat energy from an energy source to the first stream and subsequently transferring a second amount of heat energy from the first stream to the second stream;
   extracting a first amount of useful energy from the first stream;
   extracting a second amount of useful energy from the second stream;
   merging the first stream with the second stream; and
   reducing the first stream and the second stream to a minimum pressure, the minimum pressure being approximately equal to or below the vapor pressure of the working fluid at an ambient temperature.

2. The method of claim 1, wherein the working fluid is selected from the group consisting of propane, propylene, light hydrocarbons and combinations thereof.

3. The method of claim 1, wherein the minimum pressure is about 25 psia to about 300 psia.

4. The method of claim 1, wherein the ambient temperature is about −50 degrees Fahrenheit to about 160 degrees Fahrenheit.

5. The method of claim 1, wherein the energy source is selected from the group consisting of fossil fuel energy, nuclear energy, solar energy, geothermal energy, waste heat, hydrogen and combinations thereof.

6. The method of claim 1, wherein the sum of the first amount of useful energy and the second amount of useful energy is equal to at least about 20% of the first amount of heat energy.

7. The method of claim 1, wherein the step of increasing the pressure of the working fluid comprises increasing the pressure of the working fluid to about 300 psia to about 1000 psia.

8. The method of claim 1, wherein the step of transferring a second amount of heat energy from the first stream to the second stream comprises:
transferring a first portion of the second amount of heat energy from the first stream to the second stream before the step of merging the first stream with the second stream;
carrying a second portion of the second amount of heat energy into a combined stream resulting from the step of merging the first stream with the second stream; and
transferring the second portion of the second amount of heat energy from the combined stream to the second stream after the step of merging the first stream with the second stream.

9. The method of claim 8, wherein the step of transferring a first portion of the second amount of heat energy from the first stream to the second stream is performed after the step of extracting a first amount of useful energy from the first stream.

10. An apparatus for generating energy, the apparatus comprising:
multiple fluid conduits, including at least a first fluid conduit, a second fluid conduit, and a combined fluid conduit, the multiple fluid conduits being adapted to contain a working fluid;
a pump operatively attached to the multiple fluid conduits and adapted to pressurize the working fluid;
an energy source;
a first heat exchanger operatively attached to the first fluid conduit and adapted to allow a
first amount of heat energy to transfer from the energy source to the working fluid in the first fluid conduit;
a second heat exchanger operatively attached to the first fluid conduit and the second fluid conduit and adapted to allow a second amount of heat energy to transfer from the working fluid in the first fluid conduit to the working fluid in the second fluid conduit, the second heat exchanger being positioned, with respect to the first fluid conduit, downstream of the first heat exchanger;
a first fluid expander operatively attached to the first fluid conduit and adapted to extract a first amount of useful energy from the working fluid in the first fluid conduit;
a second fluid expander operatively attached to the second fluid conduit and adapted to extract a second amount of useful energy from the working fluid in the second fluid conduit;
a cooling device operatively attached to at least one of the multiple fluid conduits and adapted to reduce the working fluid to a minimum pressure, the minimum pressure being approximately equal to or below the vapor pressure of the fluid at an ambient temperature; and
wherein the first fluid conduit and the second fluid conduit join at a merge point to form the combined fluid conduit.

11. The apparatus of claim 10, wherein the working fluid is selected from the group consisting of propane, propylene, light hydrocarbons and combinations thereof.

12. The apparatus of claim 10, wherein the minimum pressure is about 25 psia to about 300 psia.

13. The apparatus of claim 10, wherein the ambient temperature is about −50 degrees Fahrenheit to about 160 degrees Fahrenheit.

14. The apparatus of claim 10, wherein the energy source is selected from the group consisting a fossil fuel burner, a nuclear reactor, a solar collector, a geothermal source, a waste heat source, hydrogen and combinations thereof.

15. The apparatus of claim 10, wherein the sum of the first amount of useful energy and the second amount of useful energy is equal to at least about 20% of the first amount of heat energy.

16. The apparatus of claim 10, wherein the pump is adapted to pressurize the working fluid to about 300 psia to about 1000 psia.

17. The apparatus of claim 10, wherein the second heat exchanger comprises:
a primary second heat exchanger operatively attached to the primary fluid conduit and the secondary fluid conduit, and being located, with respect to the first fluid conduit, between the first fluid expander and the merge point, and being adapted to transfer a first portion of the second amount of heat energy from the working fluid in the first fluid conduit to the working fluid in the second fluid conduit; and
a secondary second heat exchanger operatively attached to the second fluid conduit and the combined fluid conduit, and being positioned, with respect to the combined fluid conduit, between the merge point and the pump, and being adapted to transfer a second portion of the second amount of heat energy from the working fluid in the combined fluid conduit to the working fluid in the second fluid conduit.

18. The apparatus of claim 17, wherein the second heat exchanger is positioned, with respect to the first fluid conduit, after the first fluid expander.

19. A method for converting heat to useful energy, the method comprising:
providing a combined fluid stream in a liquid state;
pressurizing the combined fluid stream;
dividing the combined fluid stream into a primary fluid stream and a secondary fluid stream;
applying thermal energy from a heat source to vaporize the primary fluid stream;
expanding the vaporized primary fluid stream to produce a first amount of useful energy;
transferring heat from the vaporized and expanded primary fluid stream to superheat the vaporized secondary fluid stream;
expanding the vaporized second fluid stream to produce a second amount of useful energy;
mixing the vaporized and expanded primary fluid stream with the vaporized and expanded secondary fluid stream to form a combined fluid stream;
transferring heat from the combined fluid stream to vaporize the secondary fluid stream; and
condensing the combined fluid stream to a liquid state.

20. The method of claim 19, wherein the fluid is selected from the group consisting of propane, propylene, light hydrocarbons and combinations thereof.

21. The method of claim 19, wherein the step of transferring heat from the combined fluid stream to vaporize the secondary fluid stream further comprises maintaining the pressure of the combined fluid stream above the vapor pressure of the fluid.

22. An apparatus for converting heat to useful energy, the apparatus comprising:
a combined fluid conduit adapted to convey a fluid stream;
a pump operatively attached to the combined fluid conduit;

a stream separator operatively attached to the combined fluid conduit downstream of the pump, the stream separator further being operatively attached to a primary fluid conduit and a secondary fluid conduit;

a first heat exchanger operatively attached to the primary fluid conduit downstream of the stream separator, the first heat exchanger further being operatively attached to a heat source;

a first expander operatively attached to the primary fluid conduit downstream of the first heat exchanger;

a second heat exchanger operatively attached to the primary fluid conduit downstream of the first expander, the second heat exchanger further being operatively attached to the secondary fluid conduit;

a third heat exchanger operatively attached to the secondary fluid conduit downstream of the fluid separator; the third heat exchanger further being operatively attached to the combined fluid conduit;

a second expander operatively attached to the secondary fluid conduit downstream of the second heat exchanger;

a stream mixer operatively attached to the combined fluid conduit, to the primary fluid conduit downstream of the second heat exchanger, and to the secondary fluid conduit downstream of the second expander;

a cooler operatively attached to the combined fluid conduit between the stream mixer and the pump;

wherein the third heat exchanger is positioned, with respect to the combined fluid conduit, between the stream mixer and the cooler; and wherein the second heat exchanger is positioned, with respect to the secondary fluid conduit, between the third heat exchanger and the second expander.

23. The apparatus of claim 22, wherein the fluid stream is selected from the group consisting of propane, propylene, light hydrocarbons and combinations thereof.

24. The apparatus of claim 22, wherein the energy source is selected from the group consisting a fossil fuel burner, a nuclear reactor, a solar collector, a geothermal source, a waste heat source, hydrogen and combinations thereof.

25. A method for improving the efficiency of a power system having an energy source and a cooling system, the method comprising:

transferring a first amount of heat energy from the cooling system to a first loop of a cascading closed loop cycle system;

extracting a first amount of useful energy from the first loop;

transferring a second amount of heat energy from the energy source to a second loop of a cascading closed loop cycle system; and extracting a second amount of useful energy from the second loop.

26. The method of claim 25, wherein the cascading closed loop cycle system comprises a working fluid selected from the group consisting of propane, propylene, light hydrocarbons and combinations thereof.

27. The method of claim 25, further comprising:

transferring a third amount of heat energy from the second loop to a third loop of a cascading closed loop cycle system; and extracting a third amount of useful energy from the third loop.

28. The method of claim 27, wherein the power system receives a fourth amount of heat energy from the energy source and generates a fourth amount of useful energy, and wherein the sum of the first amount of useful energy, the second amount of useful energy, the third amount of useful energy and the fourth amount of useful energy is equal to at least about 30% of the fourth amount of heat energy.

29. A method for improving the efficiency of a power system having an energy source and a cooling system, the method comprising:

providing a working fluid;

increasing the pressure of the working fluid;

dividing the working fluid into multiple streams, including at least a first stream and a second stream;

transferring a first amount of heat energy from the cooling system to the first stream;

extracting a first amount of useful energy from the first stream;

transferring a second amount of heat energy from the energy source to the second stream;

extracting a second amount of useful energy from the second stream; and cooling the working fluid to a minimum pressure, the minimum pressure being approximately equal to or below the vapor pressure of the working fluid at an ambient air temperature.

30. The method of claim 29, wherein the working fluid is selected from the group consisting of propane, propylene, light hydrocarbons and combinations thereof.

31. The method of claim 29, wherein the minimum pressure is about 25 psia to about 300 psia.

32. The method of claim 29, wherein the ambient temperature is about −50 degrees Fahrenheit to about 160 degrees Fahrenheit.

33. The method of claim 29, wherein the energy source is selected from the group consisting of fossil fuel energy, nuclear energy, solar energy, geothermal energy, waste heat, hydrogen and combinations thereof.

34. The method of claim 29, wherein the power system is a steam power generation system.

35. The method of claim 29, wherein the step of increasing the pressure of the working fluid comprises increasing the pressure of the working fluid to about 300 psia to about 1000 psia.

36. The method of claim 29, wherein:

the second stream comprises a primary second stream and a secondary second stream; and the step of transferring a second amount of heat energy from the energy source to the second stream comprises:

transferring the second amount of heat energy from the energy source to the primary second stream; and transferring a portion of the second amount of heat energy from the primary second stream to the secondary second stream.

37. The method of claim 36, wherein the step of extracting a second amount of useful energy from the second stream comprises:

extracting a first portion of the second amount of useful energy from the primary second stream; and extracting a second portion of the second amount of useful energy from the secondary second stream.

38. A method for generating energy, the method comprising:

providing a first working fluid;

increasing the pressure of the first working fluid;

transferring a first amount of heat energy from an energy source to the first working fluid;

extracting a first amount of useful energy from the first working fluid;

providing a second working fluid;

increasing the pressure of the second working fluid;

dividing the second working fluid into multiple streams, including at least a first stream and a second stream;

transferring a second amount of heat energy from the first working fluid to the first stream;

extracting a second amount of useful energy from the first stream;

transferring a third amount of heat energy from the energy source to the second stream;

extracting a third amount of useful energy from the second stream; and cooling the second working fluid to a minimum pressure, the minimum pressure being approximately equal to or below the vapor pressure of the second working fluid at an ambient air temperature.

39. The method of claim 38, wherein the first working fluid is water.

40. The method of claim 38, wherein the second working fluid is selected from the group consisting of propane, propylene, light hydrocarbons and combinations thereof.

41. The method of claim 38, wherein the minimum pressure is about 25 psia to about 300 psia.

42. The method of claim 38, wherein the ambient temperature is about −50 degrees Fahrenheit to about 160 degrees Fahrenheit.

43. The method of claim 38, wherein the energy source is selected from the group consisting of fossil fuel energy, nuclear energy, solar energy, geothermal energy, waste heat and combinations thereof.

44. The method of claim 38, wherein:
the second stream comprises a primary second stream and a secondary second stream; and
the step of transferring a third amount of heat energy from the energy source to the second stream comprises:
transferring the third amount of heat energy from the energy source to the primary second stream; and
transferring a portion of the third amount of heat energy from the primary second stream to the secondary second stream.

45. The method of claim 44, wherein the step of extracting a third amount of useful energy from the second stream comprises:
extracting a first portion of the third amount of useful energy from the primary second stream; and
extracting a second portion of the third amount of useful energy from the secondary second stream.

46. A method for improving the efficiency of a power system having an energy source and a cooling system, the method comprising:
providing a working fluid;
increasing the pressure of the working fluid;
dividing the working fluid into a first stream a second stream and a third stream;
transferring a first amount of heat energy from the cooling system to the first stream;
extracting a first amount of useful energy from the first stream;
transferring a second amount of heat energy from the energy source to the second stream;
extracting a second amount of useful energy from the second stream;
transferring a third amount of heat energy from the second stream to the third stream;
extracting a third amount of useful energy from the third stream; and
cooling the working fluid to a minimum pressure, the minimum pressure being approximately equal to or below the vapor pressure of the working fluid at an ambient air temperature.

47. The method of claim 46, wherein the step of transferring a second amount of heat energy from the energy source to the second stream comprises:
transferring a first portion of the second amount of heat energy from the energy source to the second stream in a first heat exchanger; and
transferring a second portion of the second amount of heat energy from the energy source to the second stream in a second heat exchanger.

48. The method of claim 46, wherein:
the step of extracting a first amount of useful energy from the first stream comprises expanding the first stream in a first expander;
the step of extracting a second amount of useful energy from the second stream comprises expanding the second stream in a second expander; and
the step of extracting a third amount of useful energy from the third stream comprises expanding the third stream in a third expander.

49. The method of claim 46, wherein the working fluid is selected from the group consisting of propane, propylene, light hydrocarbons and combinations thereof.

50. The method of claim 46, wherein the minimum pressure is about 25 psia to about 300 psia.

51. The method of claim 46, wherein the ambient temperature is about −50 degrees Fahrenheit to about 160 degrees Fahrenheit.

52. The method of claim 46, wherein the energy source is selected from the group consisting of fossil fuel energy, nuclear energy, solar energy, geothermal energy, waste heat, hydrogen and combinations thereof.

53. The method of claim 46, wherein the power system is a steam power generation system.

54. An apparatus for generating supplemental energy from a power system having an energy source and a cooling system, the apparatus comprising:
multiple fluid conduits, including at least a first fluid conduit, a second fluid conduit, and a combined fluid conduit, the multiple fluid conduits being adapted to contain a working fluid;
one or more pumps operatively attached to the multiple fluid conduits and adapted to pressurize the working fluid;
a first heat exchanger operatively attached to the first fluid conduit and adapted to allow a first amount of heat energy to transfer from the cooling system to the working fluid in the first fluid conduit;
a first fluid expander operatively attached to the first fluid conduit and adapted to extract a first amount of useful energy from the working fluid in the first fluid conduit;
a second heat exchanger operatively attached to the second fluid conduit and adapted to allow a second amount of heat energy to transfer from the energy source to the working fluid in the second fluid conduit;
a second fluid expander operatively attached to the second fluid conduit and adapted to extract a second amount of useful energy from the working fluid in the second fluid conduit;
a cooling device operatively attached to at least one of the multiple fluid conduits and adapted to reduce the working fluid to a minimum pressure, the minimum pressure being approximately equal to or below the vapor pressure of the fluid at an ambient temperature; and wherein the first fluid conduit and the second fluid conduit join at one or more merge points to form the combined fluid conduit.

55. The apparatus of claim 54, wherein the multiple fluid conduits further include a third fluid conduit, and the apparatus further comprises:
   a third heat exchanger operatively attached to the second fluid conduit and the third fluid conduit and adapted to transfer a third amount of heat energy from the working fluid in the second fluid conduit to the working fluid in the third fluid conduit;
   a third fluid expander operatively attached to the third fluid conduit and adapted to extract a third amount of useful energy from the working fluid in the third fluid conduit; and
   wherein the third heat exchanger is located, relative the second fluid conduit, after the second fluid expander.

56. The apparatus of claim 54, wherein the second heat exchanger comprises two or more heat exchangers.

57. The apparatus of claim 54, wherein the working fluid is selected from the group consisting of propane, propylene, light hydrocarbons and combinations thereof.

58. The apparatus of claim 54, wherein the minimum pressure is about 25 psia to about 300 psia.

59. The apparatus of claim 54, wherein the ambient temperature is about −50 degrees Fahrenheit to about 160 degrees Fahrenheit.

60. The apparatus of claim 54, wherein the energy source is selected from the group consisting a fossil fuel burner, a nuclear reactor, a solar collector, a geothermal source, a waste heat source, hydrogen and combinations thereof.

61. The apparatus of claim 54, wherein the power system receives a fourth amount of heat energy from the energy source and generates a fourth amount of useful energy, and wherein the sum of the first amount of useful energy, the second amount of useful energy, the third amount of useful energy and the fourth amount of useful energy is equal to at least about 30% of the fourth amount of heat energy.

62. An apparatus for converting heat energy to useful energy, the apparatus comprising:
   a primary power system comprising:
      an energy source;
      a primary fluid conduit adapted to contain a primary working fluid;
      a primary fluid pump operatively attached to the primary fluid conduit and adapted to pressurize the primary working fluid;
      a primary fluid heat exchanger operatively attached to the primary fluid conduit and adapted to allow a first amount of heat energy to transfer from the energy source to the primary fluid contained in the primary fluid conduit;
      a primary fluid expander operatively attached to the primary fluid conduit and adapted to extract a first amount of useful energy from the primary working fluid in the primary fluid conduit;
   a secondary power system comprising:
      a secondary fluid conduit system comprising a first fluid loop, a second fluid loop, and a third fluid loop, the secondary fluid conduit system being adapted to contain a secondary working fluid;
      one or more secondary fluid pumps operatively attached to the secondary fluid conduit system and adapted to pressurize the secondary working fluid;
      a first heat exchanger operatively attached to the first fluid loop and the primary fluid conduit and being positioned, relative to the primary fluid conduit, between the primary fluid expander and the primary fluid pump, the first heat exchanger being adapted to allow a second amount of heat energy to transfer from the primary fluid in the primary working fluid conduit to the secondary working fluid in the first fluid loop;
      a first fluid expander operatively attached to the first fluid loop and adapted to extract a second amount of useful energy from the secondary working fluid in the first fluid loop;
      a second heat exchanger operatively attached to the second fluid loop and adapted to allow a third amount of heat energy to transfer from the energy source to the secondary working fluid in the second fluid loop;
      a second fluid expander operatively attached to the second fluid loop and adapted to extract a third amount of useful energy from the secondary working fluid in the second fluid loop;
      a third heat exchanger operatively attached to the second fluid loop and the third fluid loop and being located, relative the second fluid loop, after the second fluid expander, the third heat exchanger being adapted to allow a fourth amount of heat energy to transfer from the secondary working fluid in the second fluid loop to the secondary working fluid in the third fluid loop;
      a third fluid expander operatively attached to the third fluid loop and adapted to extract a fourth amount of useful energy from the secondary working fluid in the second fluid loop; and
      a cooling device operatively attached to the secondary fluid conduit system and adapted to reduce the secondary working fluid to a minimum pressure, the minimum pressure being approximately equal to or below the vapor pressure of the secondary working fluid at an ambient temperature.

63. The apparatus of claim 62, wherein the primary working fluid is water.

64. The apparatus of claim 62, wherein the secondary working fluid is selected from the group consisting of propane, propylene, light hydrocarbons and combinations thereof.

65. The apparatus of claim 62, wherein the minimum pressure is about 25 psia to about 300 psia.

66. The apparatus of claim 62, wherein the ambient temperature is about −50 degrees Fahrenheit to about 160 degrees Fahrenheit.

67. The apparatus of claim 62, wherein the energy source is selected from the group consisting a fossil fuel burner, a nuclear reactor, a solar collector, a geothermal source, a waste heat source, hydrogen and combinations thereof.

68. The apparatus of claim 62, wherein the sum of the first amount of useful energy, the second amount of useful energy, the third amount of useful energy and the fourth amount of useful energy is equal to at least about 30% of the first amount of heat energy.

69. The apparatus of claim 62, wherein the one or more secondary fluid pumps are adapted to pressurize the secondary working fluid to about 300 psia to about 1000 psia.

* * * * *